(12) United States Patent
Li et al.

(10) Patent No.: US 10,375,160 B2
(45) Date of Patent: Aug. 6, 2019

(54) MECHANISMS FOR PROGRAMMABLE COMPOSITION OF FACTOR GRAPHS

(71) Applicant: Futurewei Technologies, Inc., Plano, TX (US)

(72) Inventors: Li Li, Bridgewater, NJ (US); DaQi Ren, Saratoga, CA (US)

(73) Assignee: Futurewei Technologies, Inc., Plano, TX (US)

( * ) Notice: Subject to any disclaimer, the term of this patent is extended or adjusted under 35 U.S.C. 154(b) by 136 days.

(21) Appl. No.: 15/596,787

(22) Filed: May 16, 2017

(65) Prior Publication Data

US 2018/0337983 A1    Nov. 22, 2018

(51) Int. Cl.
*H04L 12/24* (2006.01)
*H04L 29/08* (2006.01)

(52) U.S. Cl.
CPC .......... *H04L 67/1023* (2013.01); *H04L 41/12* (2013.01); *H04L 41/16* (2013.01)

(58) Field of Classification Search
CPC ............. H04L 67/1012; H04L 67/1008; H04L 67/1023
See application file for complete search history.

(56) References Cited

U.S. PATENT DOCUMENTS

| 8,806,487 B2 * | 8/2014 | Zhang | G06F 9/45558 718/1 |
| 9,070,047 B2 | 6/2015 | Nowozin et al. | |
| 2003/0229697 A1 * | 12/2003 | Borella | H04L 67/1008 709/226 |

(Continued)

FOREIGN PATENT DOCUMENTS

| CN | 103178516 A | 6/2013 |
| CN | 104821855 A | 8/2015 |

(Continued)

OTHER PUBLICATIONS

"OASIS Topology and Orchestration Specification for Cloud Applications Version 1.0", OASIS Standard, © 2013 OASIS Open, (2013), 114 pgs.

(Continued)

*Primary Examiner* — Nam T Tran
(74) *Attorney, Agent, or Firm* — Schwegman Lundberg & Woessner, P.A.

(57) ABSTRACT

A computer-implemented method of deploying a cloud application comprises accessing, by one or more processors, a first factor graph that represents a first component of the cloud application, the first factor graph comprising a first set of nodes; accessing a second factor graph that represents a second component of the cloud application, the second factor graph comprising a second set of nodes; determining a third set of nodes that are present in both the first set of nodes and the second set of nodes; joining, by the one or more processors, the first factor graph and the second factor graph into a third factor graph, wherein the joining includes unifying the third set of nodes in the first factor graph and the second factor graph; based on the third factor graph, selecting computing resources; and deploying at least a portion of the cloud application to the selected computing resources.

19 Claims, 20 Drawing Sheets

(56) References Cited

U.S. PATENT DOCUMENTS

2012/0304170 A1* 11/2012 Morgan .............. G06F 9/45558
718/1

FOREIGN PATENT DOCUMENTS

| CN | 106059594 A | 10/2016 |
|----|-------------|---------|
| CN | 106330199 A | 1/2017  |

OTHER PUBLICATIONS

"Relational algebra", [online]. [retrieved on Aug. 17, 2017]. Retrieved from the Internet: <URL: https://en.wikipedia.org/wiki/Relational_algebra., (last edited on Jul. 31, 2017), 18 pgs.

Bardsiri, Amid Khatibi, et al., "QoS Metrics for Cloud Computing Services Evaluation", *I.J. Intelligent Systems and Applications*, 12, (2014), 27-33.

Grygorenko, Dmytro, "Cost-based Decision Making in Cloud Environments using Bayesian Networks", Master Thesis, Master of Science in Software Engineering & Internet Computing, Vienna University of Technology, (Aug. 21, 2014), 102 pgs.

Ma, Nam, et al., "Parallel Exact Inference on Multicore Using MapReduce", *2012 IEEE 24th International Symposium on Computer Architecture and High Performance Computing*, (2012), 8 pgs.

Olesen, Kristian G., et al., "Maximal Prime Subgraph Decomposition of Bayesian Networks", *FLAIRS-01 Proceedings*, (2001), 596-601.

Rao, Jia, et al., "CoSL: A Coordinated Statistical Learning Approach to Measuring the Capacity of Multi-tier Websites", *2008 IEEE International Symposium on Parallel and Distributed Processing*, (2008), 1-12.

"International Application No. PCT/CN2018/086930, International Search Report dated Jul. 31, 2018", (Jul. 31, 2018), 4 pgs.

* cited by examiner

MECHANISMS FOR PROGRAMMABLE COMPOSITION OF FACTOR GRAPHS

TECHNICAL FIELD

The present disclosure is related to machine learning and, in one particular embodiment, to mechanisms for programmable composition of factor graphs in statistical machine learning and probabilistic reasoning.

BACKGROUND

A discrete factor graph is a directed acyclic bipartite graph representing the factorization of a joint probability distribution. The nodes of the discrete factor graph are random variables with discrete values (e.g., Booleans, categories, intervals, or integers). The edges of the discrete factor graph represent causal relationships between the connected random variables. The factors of the discrete factor graph define conditional probability distributions of the random variables with matrices.

Realistic factor graphs for applications may have hundreds of nodes for which information is gathered from distinct sources. Sub-graphs may be created for each group of nodes corresponding to each of the distinct sources, but it is difficult to combine the separate sub-graphs into a coherent and conflict-free factor graph.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, a computer-implemented method of deploying a cloud application comprises: accessing, by one or more processors, a first factor graph that represents a first component of the cloud application, the first factor graph comprising a first set of nodes; accessing, by the one or more processors, a second factor graph that represents a second component of the cloud application, the second factor graph comprising a second set of nodes; determining, by the one or more processors, a third set of nodes that are present in both the first set of nodes and the second set of nodes; joining, by the one or more processors, the first factor graph and the second factor graph into a third factor graph, wherein the joining includes unifying the third set of nodes in the first factor graph and the second factor graph; based on the third factor graph, selecting, by the one or more processors, one or more computing resources; and deploying, by the one or more processors, at least a portion of the cloud application to the selected computing resources.

Optionally, in any of the preceding aspects, the selecting of the one or more computing resources comprises selecting a data center of a plurality of data centers.

Optionally, in any of the preceding aspects, the selecting of the one or more computing resources comprises selecting one or more servers of a data center.

Optionally, in any of the preceding aspects, the deploying is in response to a determination that resources allocated to the cloud application do not match the needs of the cloud application.

Optionally, in any of the preceding aspects, the cloud application is running in a first data center of a plurality of data centers; the selecting of the one or more computing resources comprises simulating deployment of the cloud application to one or more of the plurality of data centers; and the deploying of at least the portion of the cloud application to the selected computing resources comprises deploying at least the portion of the cloud application to a second data center of the plurality of data centers.

Optionally, in any of the preceding aspects, the second factor graph further comprises a set of factors; and the third set of nodes excludes nodes that are associated with more than one factor in the set of factors.

Optionally, in any of the preceding aspects, the method further includes: for each pair of nodes in the third set of nodes: determining if a first node of the pair is an ancestor node in the second factor graph of a second node of the pair; determining if the second node of the pair is an ancestor node in the second factor graph of the first node of the pair; and if the first node and the second node are each an ancestor node of the other in the second factor graph, removing the first node and the second node from the third set of nodes.

Optionally, in any of the preceding aspects, a further implementation of the aspect provides that the joining of the first factor graph and the second factor graph into the third factor graph comprises: creating the third factor graph as an empty factor graph; and, for each node in the third set of nodes: removing a factor parent of the node from the second factor graph; copying the node into the third factor graph; and setting a parent of the copied node to a parent of the node in the first factor graph.

Optionally, in any of the preceding aspects, a further implementation of the aspect provides that the joining of the first factor graph and the second factor graph into the third factor graph further comprises: for each node in the third set of nodes: setting the copied node as a parent of children of the node in the first factor graph and children of the node in the second factor graph.

Optionally, in any of the preceding aspects, a further implementation of the aspect provides that the joining of the first factor graph and the second factor graph into the third factor graph further comprises: for each node in the first set of nodes that is not in the third set of nodes: copying the node from the first factor graph into the third factor graph; and for each node in the second set of nodes that is not in the third set of nodes: copying the node from the second factor graph into the third factor graph.

Optionally, in any of the preceding aspects, a further implementation of the aspect provides that the third factor graph comprises a set of factors; and the method further comprises: identifying a first factor in the third factor graph, a first set of edges comprising all edges connected to the first factor in the third factor graph, and a fourth set of nodes comprising all nodes connected by an edge to the first factor in the third factor graph; identifying a second factor in the third factor graph, a second set of edges comprising all edges connected to the second factor in the third factor graph, and a fifth set of nodes comprising all nodes connected by an edge to the second factor in the third factor graph; removing the first factor and the first set of edges from the third factor graph; removing the second factor and the second set of edges from the third factor graph; based on the first factor and the second factor, determining a third factor; and inserting the third factor into the third factor graph, with edges connecting the third factor to the fourth set of nodes and the fifth set of nodes.

Optionally, in any of the preceding aspects, a further implementation of the aspect provides that a node is in both the fourth set of nodes and the fifth set of nodes; the edge connecting the node to the first factor is directed from the node to the first factor; the edge connecting the node to the second factor is directed from the second factor to the node; and the edge connecting the node to the third factor is directed from the third factor to the node.

Optionally, in any of the preceding aspects, a further implementation of the aspect provides that the data center is a data center of a plurality of data centers; the method further comprises: accessing characteristics of each of the plurality of data centers; and the selecting of the data center is further based on the characteristics of each of the plurality of data centers.

According to one aspect of the present disclosure, a composition server comprises a memory storage comprising instructions; and one or more processors in communication with the memory storage, wherein the one or more processors execute the instructions to perform: accessing a first factor graph that represents a first component of a cloud application, the first factor graph comprising a first set of nodes; accessing a second factor graph that represents a second component of the cloud application, the second factor graph comprising a second set of nodes; determining a third set of nodes that are present in both the first set of nodes and the second set of nodes; joining the first factor graph and the second factor graph into a third factor graph, wherein the joining includes unifying the third set of nodes in the first factor graph and the second factor graph; based on the third factor graph, selecting one or more computing resources; and deploying at least a portion of the cloud application to the selected computing resources.

Optionally, in any of the preceding aspects, the selecting of the one or more computing resources comprises selecting a data center of a plurality of data centers.

Optionally, in any of the preceding aspects, the selecting of the one or more computing resources comprises selecting one or more servers of a data center.

Optionally, in any of the preceding aspects, the deploying is in response to a determination that resources allocated to the cloud application do not match the needs of the cloud application.

Optionally, in any of the preceding aspects, the cloud application is running in a first data center of a plurality of data centers; the selecting of the one or more computing resources comprises simulating deployment of the cloud application to one or more of the plurality of data centers; and the deploying of at least the portion of the cloud application to the selected computing resources comprises deploying at least the portion of the cloud application to a second data center of the plurality of data centers.

Optionally, in any of the preceding aspects, a further implementation of the aspect provides that the second factor graph further comprises a set of factors; and the third set of nodes excludes nodes that are associated with more than one factor in the set of factors.

Optionally, in any of the preceding aspects, a further implementation of the aspect provides that the processors further perform, for each pair of nodes in the third set of nodes: determining if a first node of the pair is an ancestor node in the second factor graph of a second node of the pair; determining if the second node of the pair is an ancestor node in the second factor graph of the first node of the pair; and if the first node and the second node are each an ancestor node of the other in the second factor graph, removing the first node and the second node from the third set of nodes.

Optionally, in any of the preceding aspects, a further implementation of the aspect provides that the joining of the first factor graph and the second factor graph into the third factor graph comprises: creating the third factor graph as an empty factor graph; and for each node in the third set of nodes: removing a factor parent of the node from the second factor graph; copying the node into the third factor graph; and setting a parent of the copied node to a parent of the node in the first factor graph.

Optionally, in any of the preceding aspects, a further implementation of the aspect provides that the joining of the first factor graph and the second factor graph into the third factor graph further comprises: for each node in the third set of nodes: setting the copied node as a parent of children of the node in the first factor graph and children of the node in the second factor graph.

Optionally, in any of the preceding aspects, a further implementation of the aspect provides that the second factor graph further comprises a set of factors; and the third set of nodes excludes nodes that are associated with more than one factor in the set of factors.

Optionally, in any of the preceding aspects, a further implementation of the aspect provides that the processors further perform: for each pair of nodes in the third set of nodes: determining if a first node of the pair is an ancestor node in the second factor graph of a second node of the pair; determining if the second node of the pair is an ancestor node in the second factor graph of the first node of the pair; and if the first node and the second node are each an ancestor node of the other in the second factor graph, removing the first node and the second node from the third set of nodes.

According to one aspect of the present disclosure, there is provided a non-transitory computer-readable medium that stores computer instructions for deploying a cloud application that, when executed by one or more processors, cause the one or more processors to perform steps of: accessing a first factor graph that represents a first component of the cloud application, the first factor graph comprising a first set of nodes; accessing a second factor graph that represents a second component of the cloud application, the second factor graph comprising a second set of nodes; determining a third set of nodes that are present in both the first set of nodes and the second set of nodes; joining the first factor graph and the second factor graph into a third factor graph, wherein the joining includes unifying the third set of nodes in the first factor graph and the second factor graph; based on the third factor graph, selecting one or more computing resources; and deploying at least a portion of the cloud application to the selected computing resources.

Any one of the foregoing examples may be combined with any one or more of the other foregoing examples to create a new embodiment within the scope of the present disclosure.

DETAILED DESCRIPTION

Figure 1:
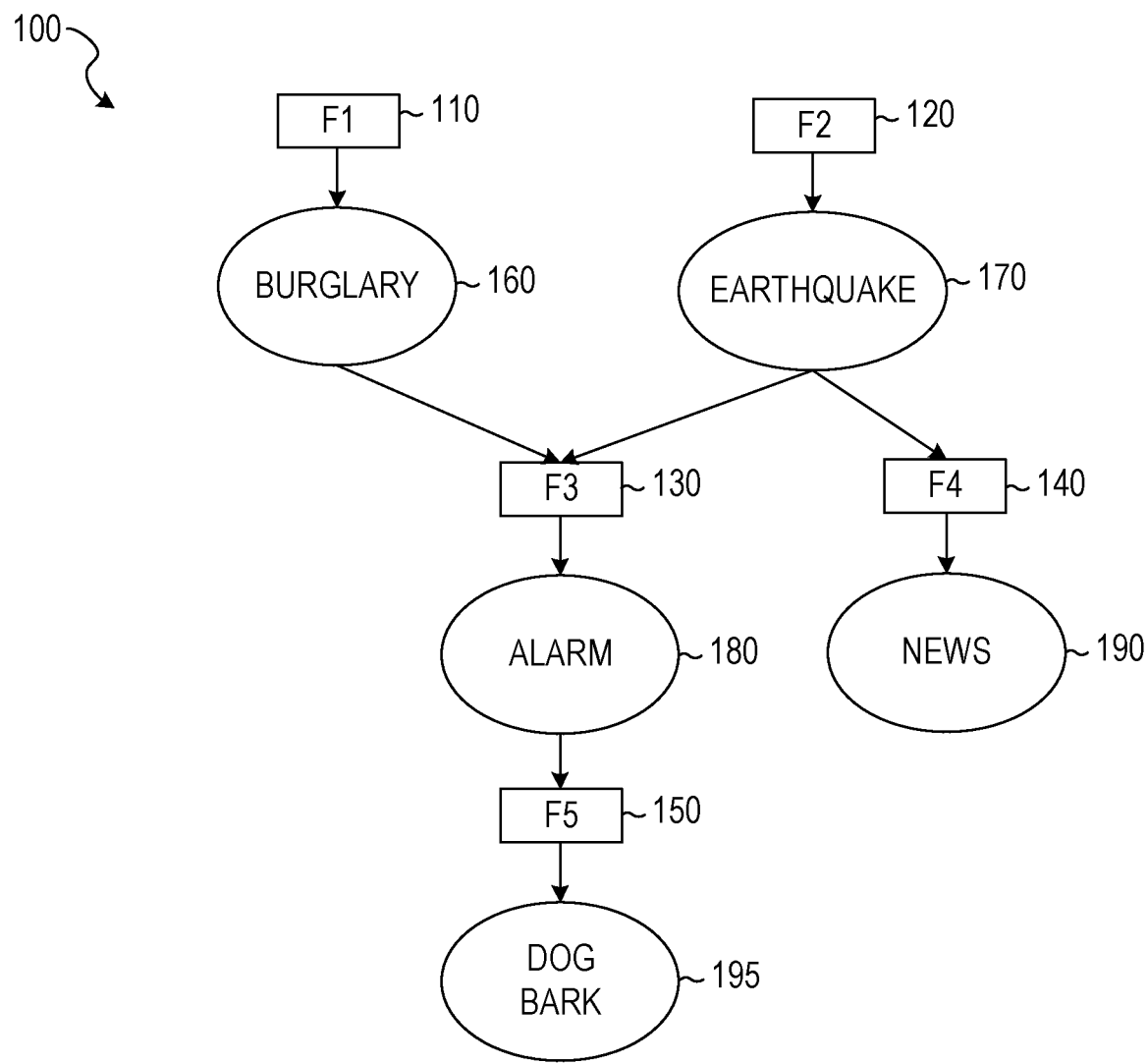
FIG. 1 is a block diagram illustration of a factor graph, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

A cloud application typically consists of many distributed software components that demand various computing resources and communicate over data center networks. Existing tools are limited to analyzing and predicting resource demands of individual components and do not scale well to forecasting the needs of entire cloud applications. A computing resource is any resource that may be utilized by an executing computer program. Example computing resources include, but are not limited to: central processing units (CPUs), processor cores, virtual memory, physical memory, storage, network bandwidth, file handles, network sockets, locks, cache memory, and random number generators. A component of a cloud application is a process, group of processes, or communication between or among two or more processes or groups of processes. Example components include, but are not limited to: virtual machines, instances of applications, and network connections between or among applications.

The resource demands of individual components are modeled using factor graphs. Using a factor graph composition mechanism described herein, a composition server combines component factor graphs to generate a composite factor graph that represents an entire cloud application. Using the composite factor graph, computing resources of the data center supporting the cloud application may be allocated. The cloud application is deployed to the allocated computing resources. Deploying a cloud application refers to the process of installing and activating each of the components of the cloud application. For example, one or more executable files for each component are copied to a memory or storage device allocated to the component, and one or more allocated CPUs are used to execute the component.

FIG. 1 is a block diagram illustration of a factor graph 100, according to some example embodiments. The factor graph 100 includes factors 110, 120, 130, 140, and 150 as well as nodes 160, 170, 180, 190, and 195. Factors and nodes are connected by directional edges, such that each of the factors 110-150 has only node parents and each of the nodes 160-195 has only factor parents. In the factor graph 100, each of the nodes 160-195 is a Boolean value. Thus, there is or is not an event corresponding to each of the nodes. The probability of the burglary node 160 being true is indicated by the independent factor 110. The probability of the earthquake node 170 being true is indicated by the independent factor 120. The probability of the alarm node 180 being true is determined by the factor 130, based on the values of the burglary node 160 and the earthquake node 170. The probability of the news node 190 being true is determined by the factor 140, based on the value of the earthquake node 170. The probability of the dog bark node 195 being true is determined by the factor 150, based on the value of the alarm node 180.

In some example embodiments, each of the factors 110-150 defines a conditional probability distribution of its child nodes using an m×n matrix for each child node. The matrix includes one column for each possible value of the child node and one row for each combination of values of the parent nodes. When there are no parent nodes, the matrix reduces to a single row, the probability distribution of the value of the child node having the value corresponding to each column. Thus the matrix corresponding to the factor 130 would have four rows (one for each combination of true and false of the burglary node 160 and the earthquake node 170) and two columns (one for true and one for false). The probability of the child node being true is the value of the element in the matrix corresponding to the states of the parent nodes of the matrix and the output value of true. For example, if the matrix for the factor 130 is $$\begin{bmatrix} .8 & .2 \\ .3 & .7 \\ .4 & .6 \\ .1 & .9 \end{bmatrix},$$

the top row corresponds to the burglary node 160 and the earthquake node 170 both being true, the second row corresponds to the burglary node 160 being true and the earthquake node 170 being false, the third row corresponds to the burglary node 160 being false and the earthquake node 170 being true, the bottom row corresponds to the burglary node 160 and the earthquake node 170 both being false, the left column corresponds to the value of true, the right column corresponds to the value of false, the burglary node 160 is false, and the earthquake node 170 is true, then the probability of the alarm node 180 being true is 0.4.

In some example embodiments, the factors 110-150, the structure of the factor graph 100, or both are learned from training data. Using the factor graph 100, the marginal probabilities and conditional probabilities of any subset of the random variables may be estimated exactly or approximately.

Figure 2:
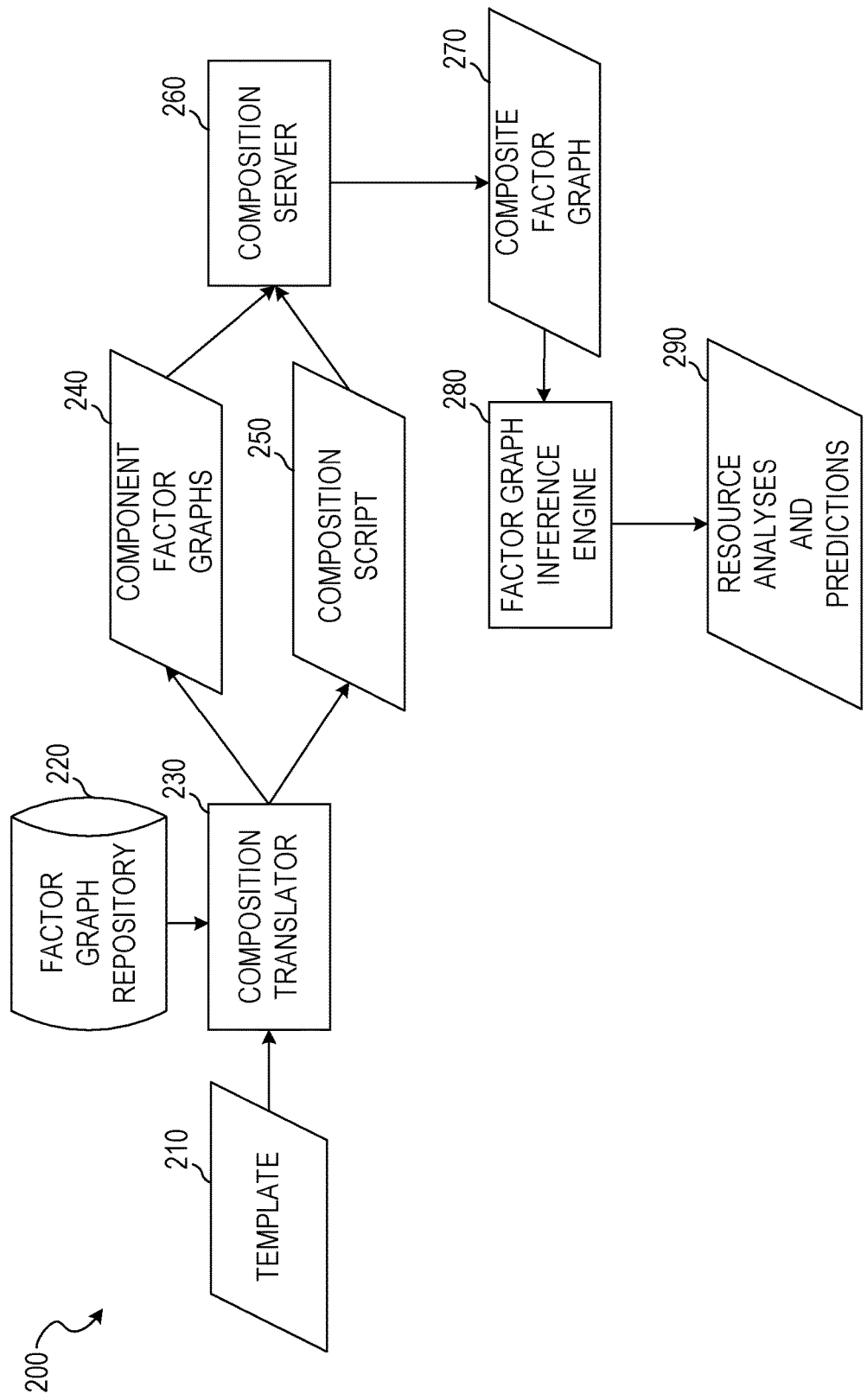
FIG. 2 is a block diagram illustration of a data flow suitable for programmable composition of factor graphs, according to some example embodiments.

FIG. 2 is a block diagram illustration of a data flow 200 suitable for programmable composition of factor graphs, according to some example embodiments. Shown in the data flow 200 are a template 210 and a factor graph repository 220, used as inputs to a composition translator 230. The composition translator 230 produces component factor graphs 240 and a composition script 250, which are inputs for a composition server 260. The composition server 260 produces a composite factor graph 270, which is provided to a factor graph inference engine 280. The factor graph inference engine 280 produces resource analyses and predictions 290.

The template 210 describes relationships between or among components of a distributed cloud application. The template 210 may be a topology and orchestration specification for cloud computing (TOSCA) template or a heat orchestration (Heat) template. Example TOSCA relations are "Process X contain Process Y" and "Process X connect Process Y."

Each component and relation in the template 210 may correspond to a component factor graph in the factor graph repository 220. For example, u1 may be a component factor graph of Process X, u2 may be a component factor graph of Process Y, u3 may be a component factor graph of the containment relation, and u4 may be a component factor graph of the network connection relation.

The composition translator 230 selects the appropriate factor graphs (e.g., the graphs u1-u4) from the factor graph repository 220 based on the relationships described in the template 210. The selected factor graphs are produced as component factor graphs 240. The composition translator 230 also produces the composition script 250. The composition script 250 defines relationships between or among the factor graphs that correspond to the relationships between or among the components and resources described by the template 210.

In an example embodiment, the composition script 250 is formed using the following pseudo-code:

```
Script = Composition_Translaction(TOSCA graph, entry S)
scripts = [ ]
Breadth-First Traversal of TOSCA graph from entry S:
    for each parent P
        for each child C of P
            R = relationship from P to C
            if R == contain
                script_i = containment script for P and C
            else if R == connect
                script_i = connection script for P and C
            else
                script_i = ''
            scripts.append(script_i)
    return scripts
```

An example composition script for "Process X contain Process Y" is:
g1=Graph('u1')
g2=Graph('u2')
g3=Graph('u3')
c=Composer( )
g0=c.join(g1, g3, g2)

An example composition script for "Process X connect Process Y" is:
g1=Graph('u1')
g2=Graph('u2')
g4=Graph('u4')
c=Composer( )
g0=c.join(g1, g4, g2)

The composition server 260 uses the composition script 250 to combine the component factor graphs 240 to produce the composite factor graph 270. As compared to the component factor graphs 240, which each represent an individual component or relationship, the composite factor graph 270 represents the entire distributed cloud application of the template 210.

The composition server 260 may provide an application programming interface (API) as described in the tables below. "OOP" refers to object-oriented programming, such as Java or C++. "REST" refers to representational state transfer, often used with the hypertext transport protocol (HTTP).

| OOP | REST Services | Action |
|---|---|---|
| Graph = new Graph(Reference) | Graph URI = POST . . . /graphs[Reference] | Create a new factor graph from a file, stream, uniform resource identifier (URI), etc. |
| Composer = new Composer( ) | Composer URI = POST . . . /composers [ ] | Create a Composer |
| Graph = Composer.{operator} (Graph, . . . ) | Graph URI = POST {Composer URI}/{operator} [Graph URI, . . . ] | Compose/Transform factor graphs with {operator} |

The Composer may support the following operators:

| Operator | Action |
|---|---|
| Graph = Composer.join(Graphs, Nodes) | Combine N factor graphs into one at the interface Nodes |
| Graph = Composer.select(Graph, FX, map) | Modify the content of a factor node FX with function map in Graph |
| Graph = Composer.project(Graph, VX, [C1, . . . , Cn]) | Remove random values from variable node VX in Graph |

| Operator | Action |
|---|---|
| Graph = Composer.reduce(Graph, [F1, . . . , Fn]) | Combine multiple factors into one in Graph |

The factor graph inference engine 280 generates the resource analyses and predictions 290 based on information about resource availability and the composite factor graph 270.

The composition translator 230, composition server 260, and factor graph inference engine 280 may each be implemented in a computing device 900, described below with respect to FIG. 9.

Figure 3:
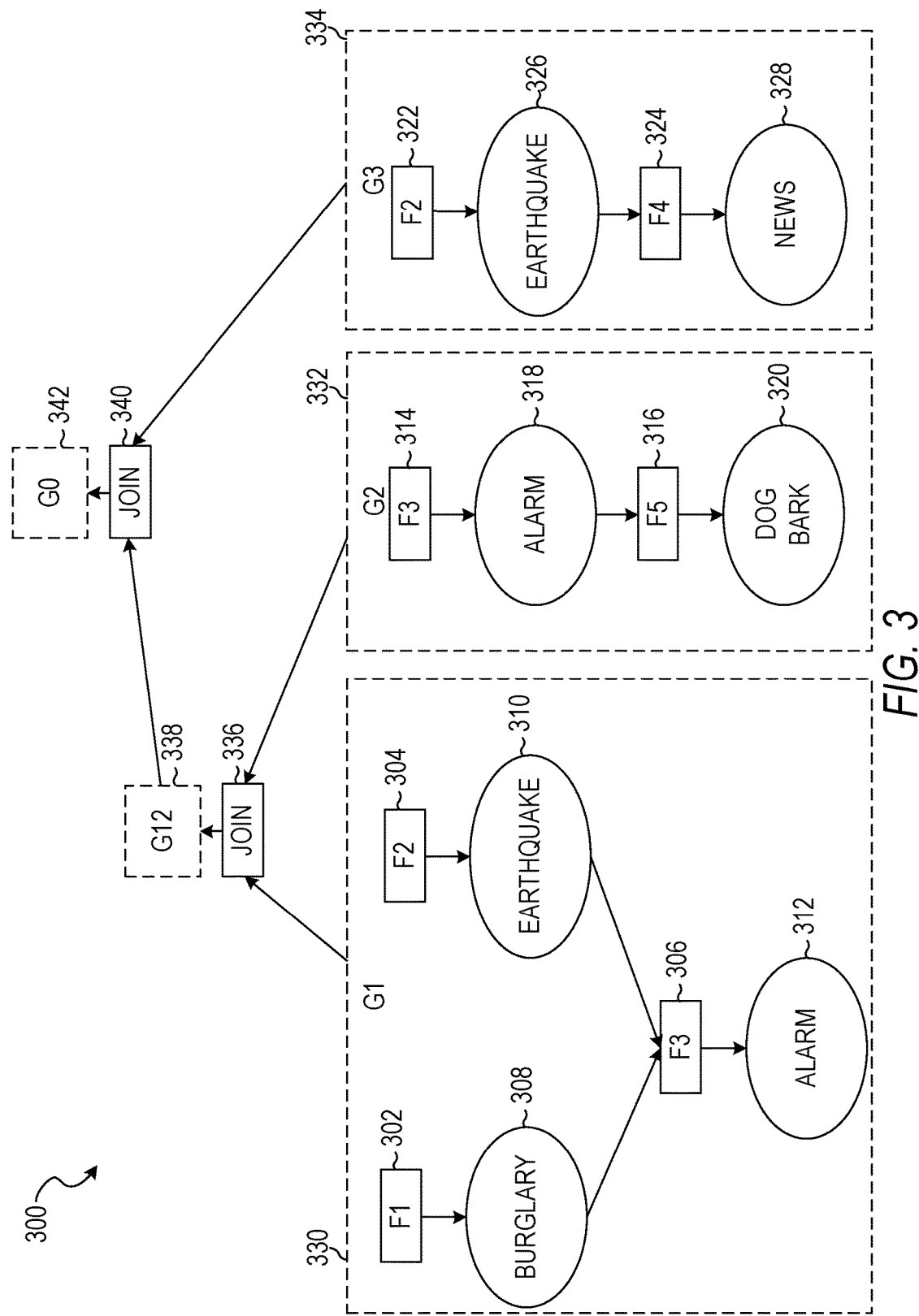
FIG. 3 is a block diagram illustration of composition of factor graphs, according to some example embodiments.

FIG. 3 is a block diagram illustration 300 of composition of factor graphs 330, 332, and 334, according to some example embodiments. The factor graph 330 includes factors 302, 304, and 306 as well as nodes 308, 310, and 312. The factor graph 332 includes factors 314 and 316 as well as nodes 318 and 320. The factor graph 334 includes factors 322 and 324 as well as nodes 326 and 328. The factor graphs 330 and 332 are combined via a join operation 336 to form a factor graph 338. The factor graphs 338 and 334 are combined via a join operation 340 to form a factor graph 342.

In FIG. 3, the factor graph 330 (labeled "G1"), the factor graph 332 (labeled "G2"), and the factor graph 334 (labeled "G3") are component factor graphs. The factor graph 338 (labeled "G12") and the factor graph 342 (labeled "G0") are composite factor graphs. The composite factor graphs may be produced by the composition server 260 executing the composition script 250, described above with respect to FIG. 2.

The interface nodes between the factor graphs 330 and 332 are the nodes 312 and 318, both labeled "Alarm." Thus, the join operation 336 will create the composite factor graph 338 with merged nodes 312 and 318 as well as merged factors 306 and 314.

The interface nodes between the factor graphs 338 and 334 are the nodes 310 and 326, both labeled "Earthquake." Thus, the join operation 340 will create the composite factor graph 342 with merged nodes 326 and 310 as well as merged factors 322 and 304. The resulting factor graph 342 is shown in FIG. 1 as the factor graph 100.

An example composition script is below, wherein [A] refers to nodes labeled "Alarm" and [Q] refers to nodes labeled "Earthquake."
g1=Graph(' . . . /factor-graphs/1')
g2=Graph(' . . . /factor-graphs/2')
g3=Graph(' . . . /factor-graphs/3')
c=Composer( )
g12=C.join(g1, g2, [A])
g0=C.join(g12, g3, [Q])

Figure 4:
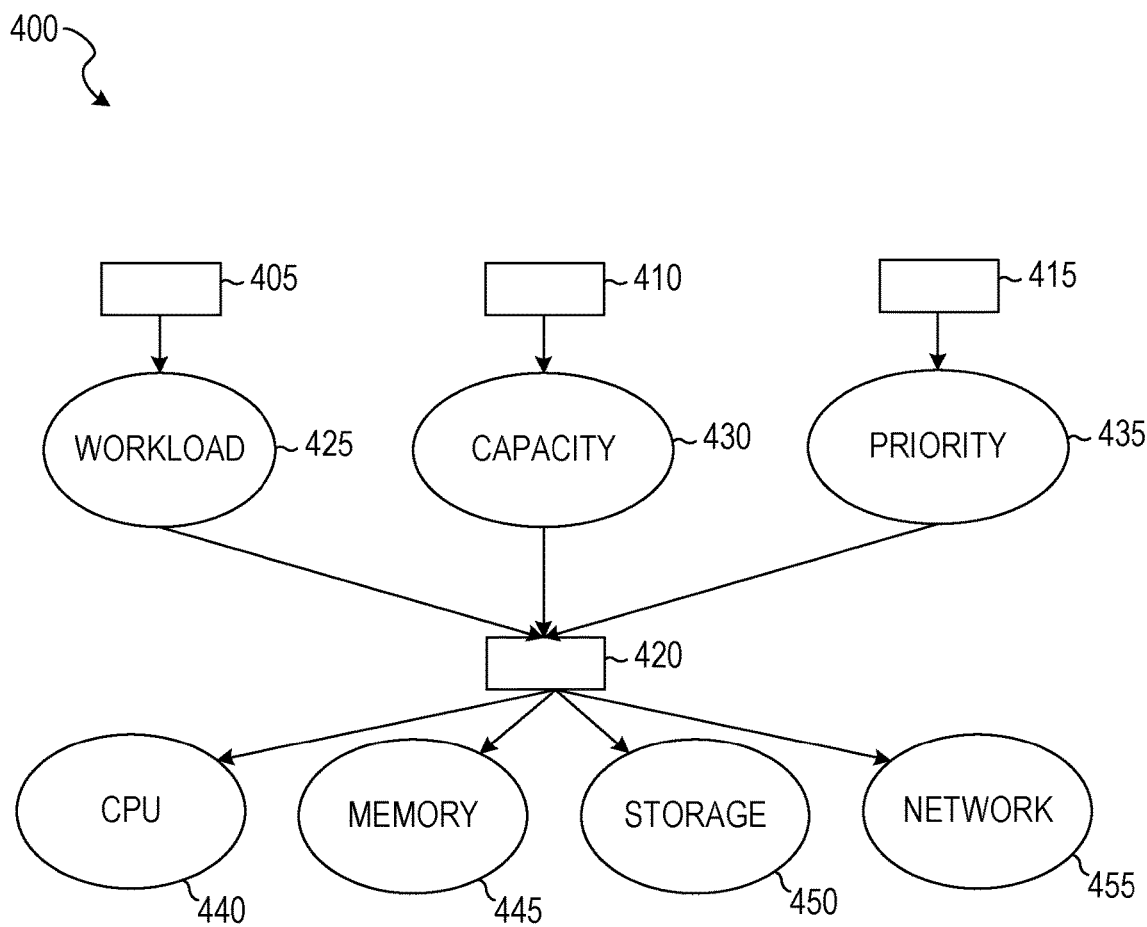
FIG. 4 is a block diagram illustration of a factor graph, according to some example embodiments.

FIG. 4 is a block diagram illustration of a factor graph 400, according to some example embodiments. The factor graph 400 includes factors 405, 410, 415, and 420 as well as nodes 425, 430, 435, 440, 445, 450, and 455. The factor graph 400 may be used as a component factor graph for a process or thread that models the probabilistic causal relations among the workload node 425, the machine capacity node 430, the process or thread priority node 435, and resulting resource allocations of CPU time, memory, storage, and network bandwidth (represented by the nodes 440-455).

Figure 5:
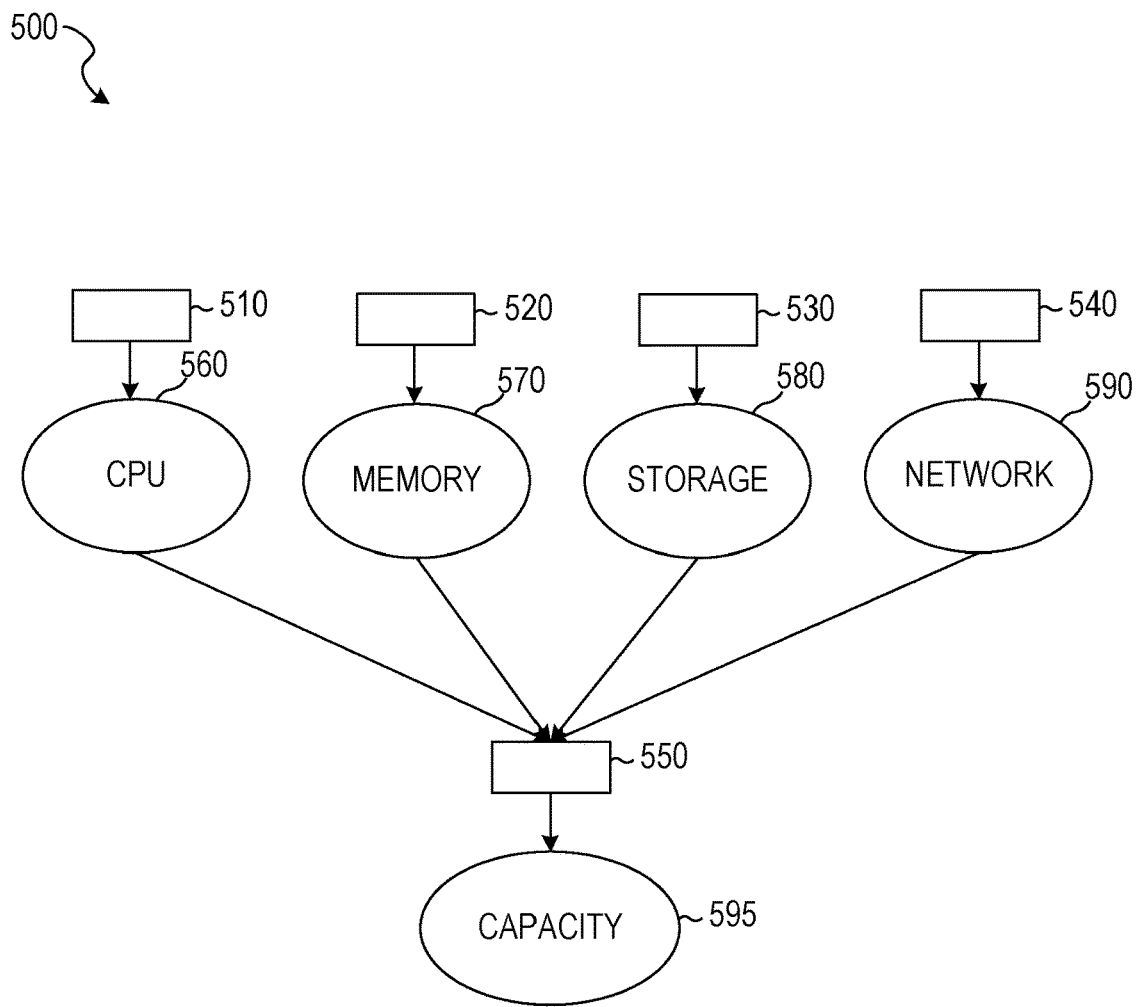
FIG. 5 is a block diagram illustration of a factor graph, according to some example embodiments.

FIG. 5 is a block diagram illustration of a factor graph 500, according to some example embodiments. The factor graph 500 includes factors 510, 520, 530, 540, and 550 and nodes 560, 570, 580, 590, and 595. The factor graph 500 may be used as a component factor graph for a containment relation that models the probabilistic causal relations between available resources (represented by the nodes 560-590) and usable capacity (represented by the node 595). Example containment relations include a physical machine that contains a virtual machine, a virtual machine that contains Docker containers, a Docker container that contains processes, or any suitable combination thereof. A Docker container is an executable software package that includes a software application along with support libraries and data used by the software application. For example, the Docker container may include a runtime library, system tools, system libraries, and a settings database.

In different example embodiments, different resources are modeled. For example, in FIG. 5, the nodes 560-590 model CPU, memory, storage, and network resources. Additional or alternate resources include packet loss frequency, connection error rate, message passing interface (MPI) transfer speed, data throughput, transmission control protocol (TCP) transfer speed, user datagram protocol (UDP) transfer speed, Internet protocol (IP) transfer speed, CPU load percentage, instance efficiency, benchmark operations per second, benchmark efficiency, mean memory access time, mean memory put time, mean memory get time, memory speed, random memory update rate, intra-node memory access scaling, memory performance drop under increasing workload, Unix benchmark utility score, one-byte data access rate of storage, benchmark input/output (I/O) operation speed, blob I/O operation speed, table I/O operation speed, queue I/O operation speed, I/O access retry rate, benchmark I/O speed, job computation time, job communication time, or any suitable combination thereof.

Figure 6:
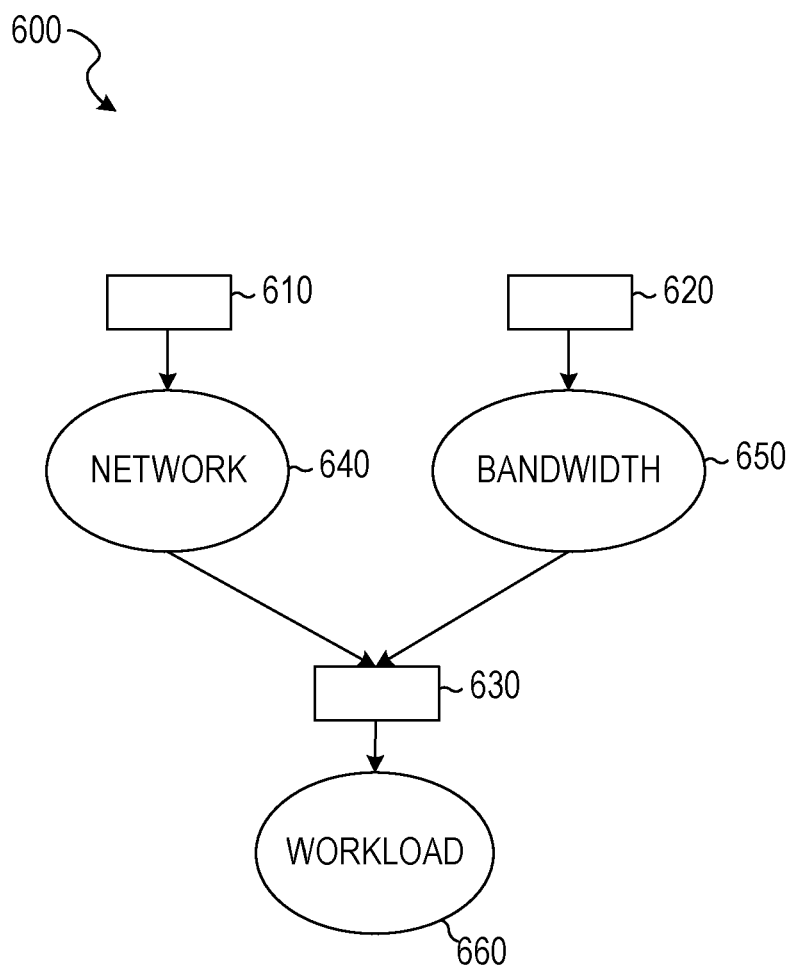
FIG. 6 is a block diagram illustration of a factor graph, according to some example embodiments.

FIG. 6 is a block diagram illustration of a factor graph 600, according to some example embodiments. The factor graph 600 includes factors 610, 620, and 630 as well as nodes 640, 650, and 660. The factor graph 600 may be used as a component factor graph for a network connection that models the probabilistic causal relations among network demand (represented by the node 640), available bandwidth (represented by the node 650), and workload (represented by the node 660).

Figure 7A:
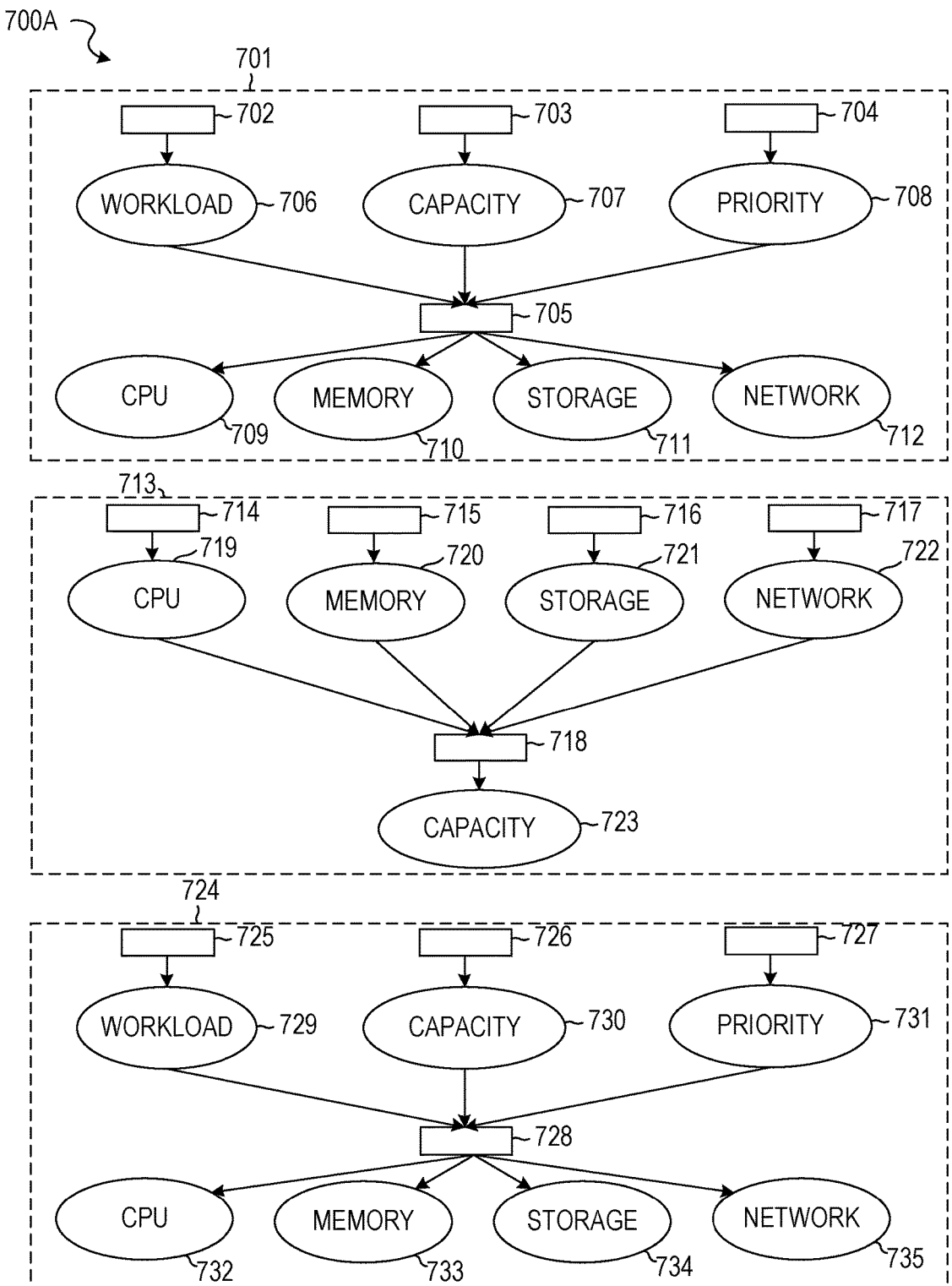
FIG. 7A is a block diagram illustration of factor graphs to be combined, according to some example embodiments.

FIG. 7A is a block diagram illustration 700A of factor graphs to be combined, according to some example embodiments. FIG. 7A shows factor graphs 701, 713, and 724. The factor graphs 701 and 724 are copies of the factor graph 400 and the factor graph 713 is a copy of the factor graph 500. The factor graph 701 includes factors 702, 703, 704, and 705 and nodes 706, 707, 708, 709, 710, 711, and 712. The factor graph 713 includes factors 714, 715, 716, 717, and 718 and nodes 719, 720, 721, 722, and 723. The factor graph 724 includes factors 725, 726, 727, and 728 and nodes 729, 730, 731, 732, 733, 734, and 735. The factors of the factor graphs 701 and 724 correspond to the factors 405-420 and the nodes of the factor graphs 701 and 724 correspond to the nodes 425-455, each of which are described above with respect to FIG. 4. The factors of the factor graph 713 correspond to the factors 510-550 and the nodes of the factor graph 713 correspond to the nodes 560-595, each of which are described above with respect to FIG. 5. As can be seen in FIG. 7A, the nodes 709-712 of the factor graph 701 align with, and have the same labels as, the nodes 719-722 of the factor graph 713. Additionally, the node 723 of the factor graph 713 aligns with, and has the same label as, the node 730 of the lower factor graph 724. Thus, the nodes 709-712 of the factor graph 701 and the nodes 719-722 of the factor graph 713 may be interface nodes for a join operation. Likewise, the node 723 of the factor graph 713 and the node 730 of the lower factor graph 724 may be interface nodes for a join operation.

Figure 7B:
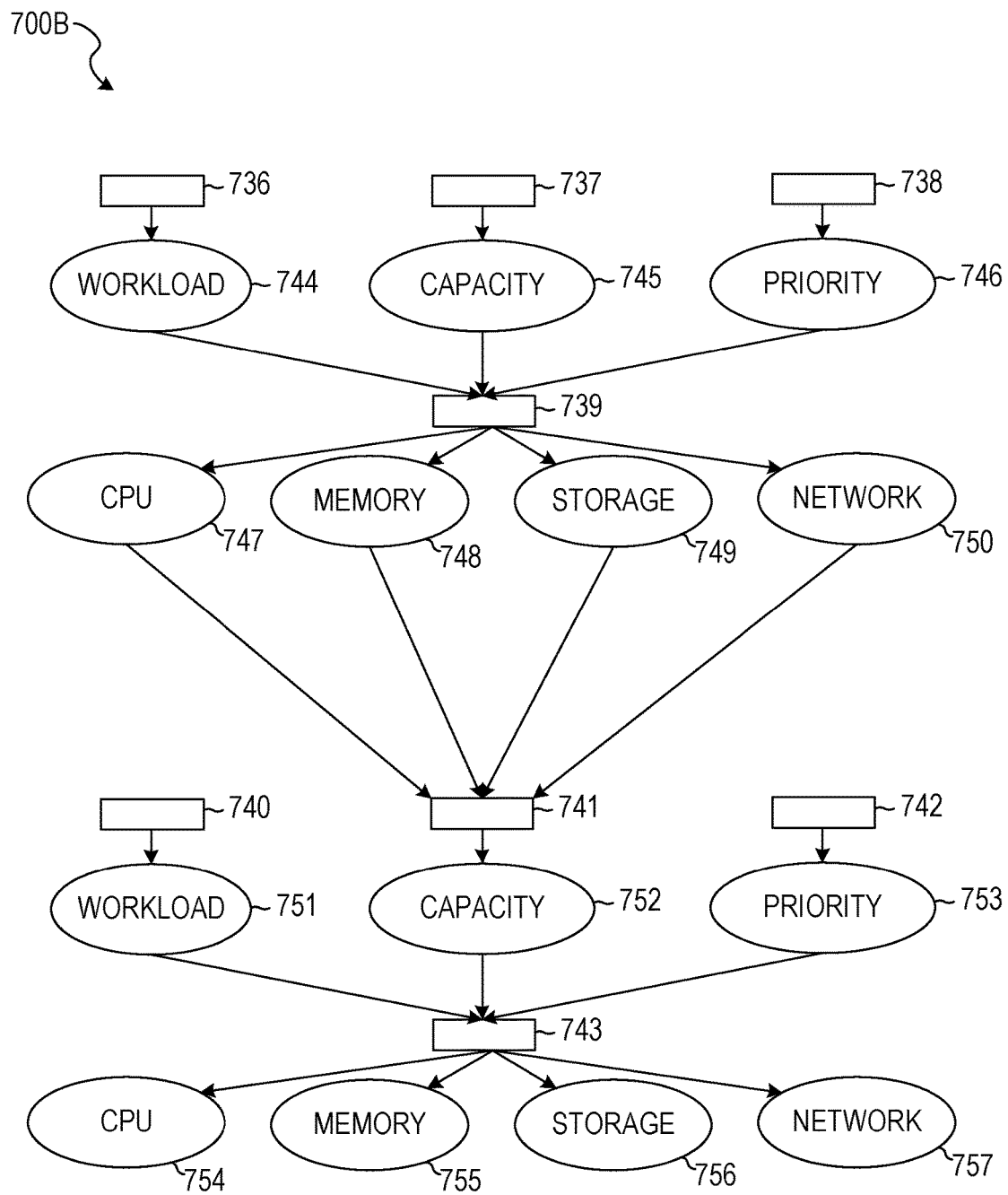
FIG. 7B is a block diagram illustration of combined factor graphs, according to some example embodiments.

FIG. 7B is a block diagram illustration 700B of combined factor graphs, according to some example embodiments. The block diagram illustration 700B shows a composite factor graph resulting from the combination of the factor graphs shown in FIG. 7A. The composite factor graph includes factors 736, 737, 738, 739, 740, 741, 742, and 743 as well as nodes 744, 745, 746, 747, 748, 749, 750, 751, 752, 753, 754, 755, 756, and 757. The nodes 744-746 correspond to the nodes 706-708 of the factor graph 701 of FIG. 7A. The values of the factors 736-738 are the same as the values of the factors 702-704 of the factor graph 701 of FIG. 7A. The nodes 747-750 result from the merger of the nodes 709-712 of the factor graph 701 of FIG. 7A with the nodes 719-722 of the factor graph 713 of FIG. 7A. The node 752 results from the merger of the node 723 of the factor graph 713 of FIG. 7A with the node 730 of the lower factor graph 724 of FIG. 7A. The remaining nodes 751 and 753-757 correspond to the nodes 729 and 731-735 of the factor graph 724 of FIG. 7A.

In some example embodiments, the factor graph 701 of FIG. 7A represents a first process (e.g., a Docker container), the factor graph 713 of FIG. 7A represents a containment relationship, and the factor graph 724 of FIG. 7A represents a second process (e.g., a virtual machine). Thus, the composite factor graph of FIG. 7B represents the first process including details of its contained second process.

Figure 8A:
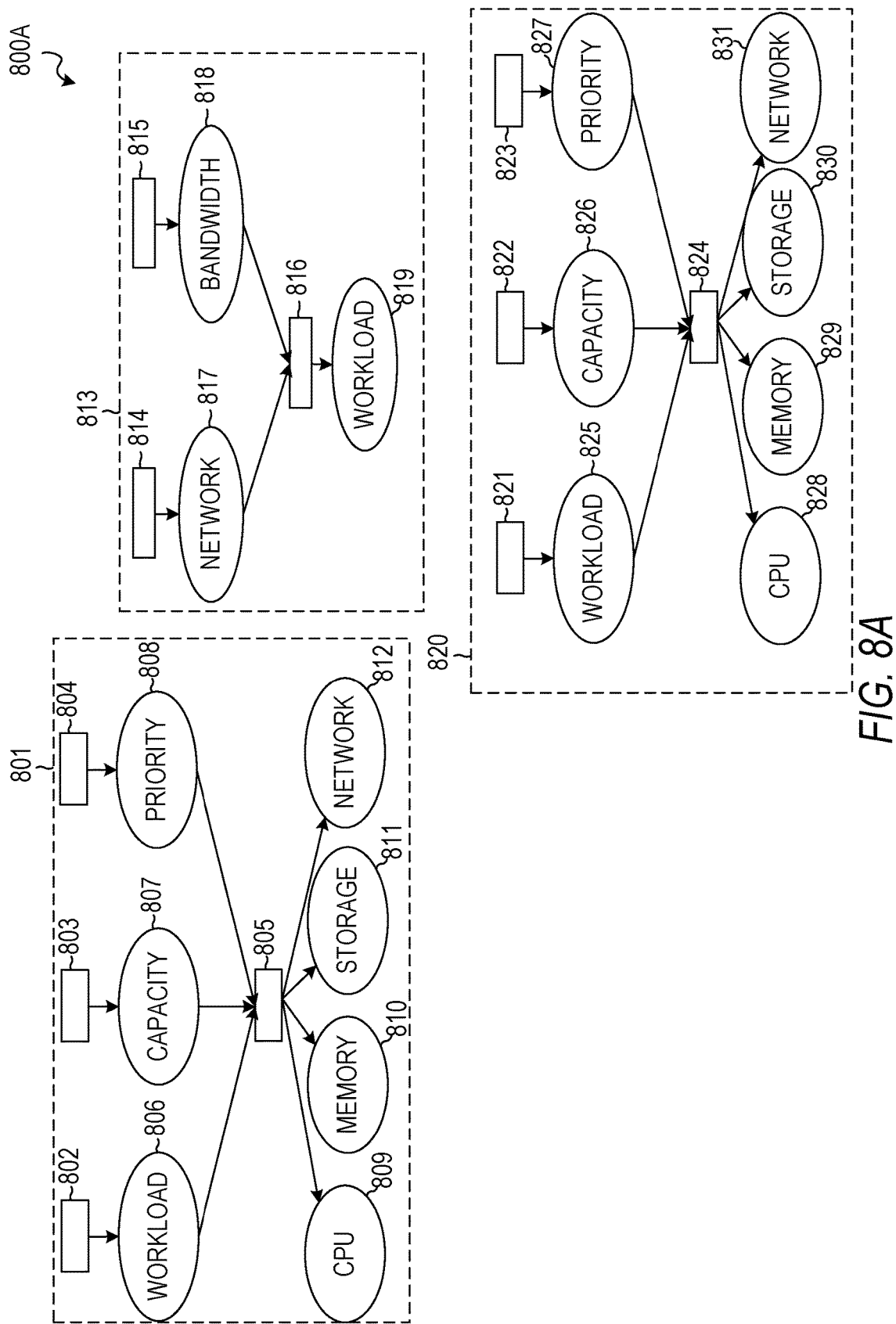
FIG. 8A is a block diagram illustration of factor graphs to be combined, according to some example embodiments.

FIG. 8A is a block diagram illustration 800A of factor graphs to be combined, according to some example embodiments. FIG. 8A shows factor graphs 801, 813, and 820. The factor graphs 801 and 820 are copies of the factor graph 400 and the factor graph 813 is a copy of the factor graph 600. The factor graph 801 includes factors 802, 803, 804, and 805 and nodes 806, 807, 808, 809, 810, 811, and 812. The factor graph 813 includes factors 814, 815, and 816 and nodes 817, 818, and 819. The factor graph 820 includes factors 821, 822, 823, and 824 and nodes 825, 826, 827, 828, 829, 830, and 831. The factors of the factor graphs 801 and 820 correspond to the factors 405-420 and the nodes of the factor graphs 801 and 820 correspond to the nodes 425-455, each of which are described above with respect to FIG. 4. The factors of the factor graph 813 correspond to the factors 610-630 and the nodes of the factor graph 813 correspond to the nodes 640-660, each of which are described above with respect to FIG. 6. As can be seen in FIG. 8A, the node 812 of the factor graph 801 has the same label as the node 817 of the factor graph 813. Additionally, the node 819 of the factor graph 813 has the same label as the node 825 of the factor graph 820. Thus, the node 812 of the factor graph 800 and the node 817 of the factor graph 813 may be interface nodes for a join operation. Likewise, the node 819 of the factor graph 813 and the node 825 of the factor graph 820 may be interface nodes for a join operation.

Figure 8B:
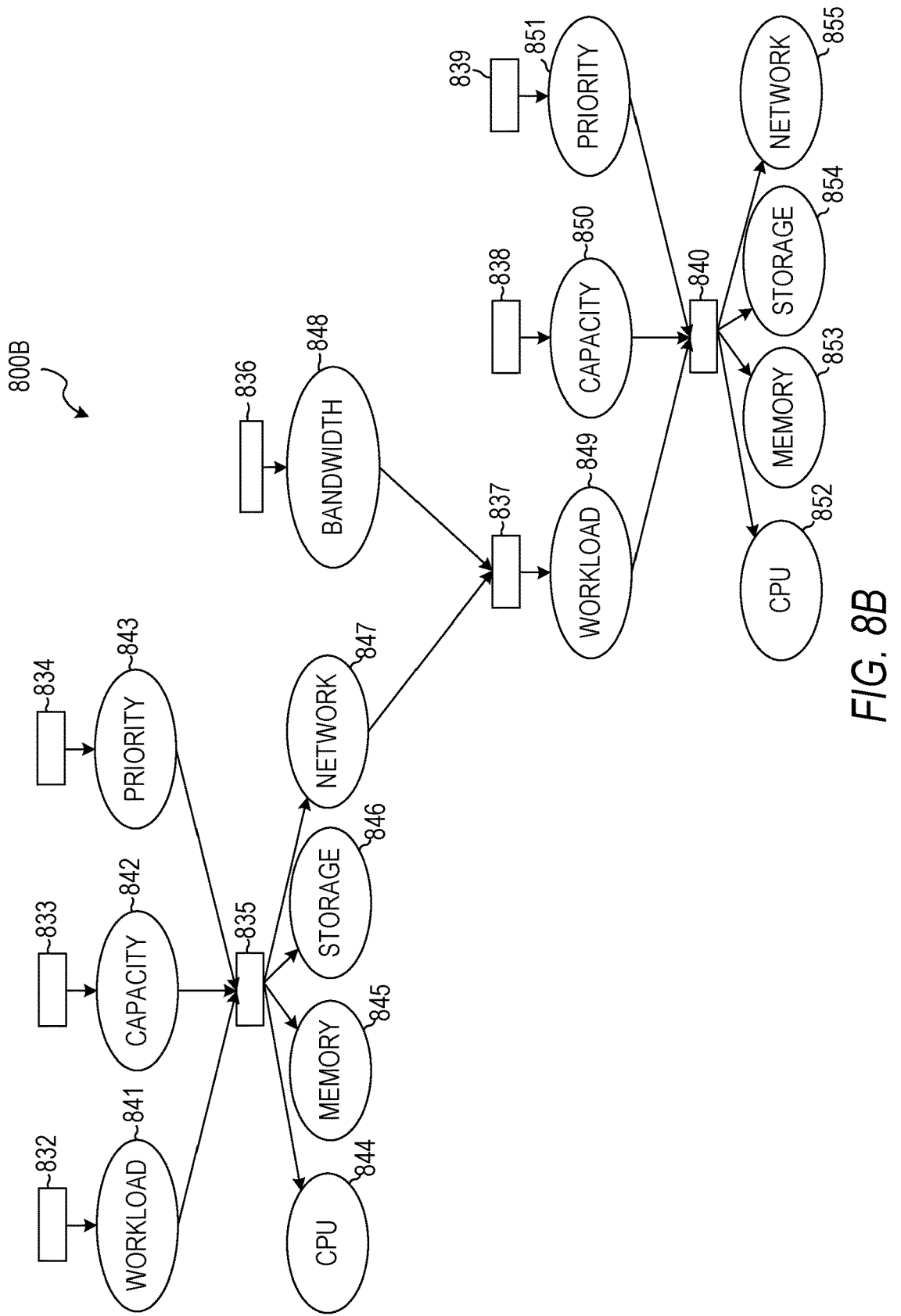
FIG. 8B is a block diagram illustration of combined factor graphs, according to some example embodiments.

FIG. 8B is a block diagram illustration 800B of combined factor graphs, according to some example embodiments. The block diagram illustration 800B shows a composite factor graph resulting from the combination of the factor graphs shown in FIG. 8A. The composite factor graph includes factors 832, 833, 834, 835, 836, 837, 838, 839, and 840 as well as nodes 841, 842, 843, 844, 845, 846, 847, 848, 849, 850, 851, 852, 853, 854, and 855. The nodes 841-846 correspond to the nodes 806-811 of the factor graph 801 of FIG. 8A. The values of the factors 832-834 are the same as the values of the factors 802-804 of the factor graph 801 of FIG. 8A. The node 847 results from the merger of the node 812 of the factor graph 801 of FIG. 8A with the node 817 of the factor graph 813 of FIG. 8A. The node 848 corresponds to the node 818 of the factor graph 813 of FIG. 8A. The value of the factor 836 is the same as the value of the factor 815 of the factor graph 813 of FIG. 8A. The node 849 results from the merger of the node 819 of the factor graph 813 of FIG. 8A with the node 825 of the factor graph 820 of FIG. 8A. The remaining nodes 850-855 correspond to the nodes 826-831 of the factor graph 820 of FIG. 8A.

In some example embodiments, the factor graph 801 of FIG. 8A represents a first process (e.g., a web server), the factor graph 813 of FIG. 8A represents a connection relationship, and the factor graph 820 of FIG. 8A represents a second process (e.g., an application server). Thus, the composite factor graph of FIG. 8B represents the first process in communication with the second process. For a cloud application with many components and relations, the composition patterns of FIGS. 7A-8B may be repeated many times, as determined by a composition script (e.g., the composition script 250 of FIG. 2).

Figure 9:
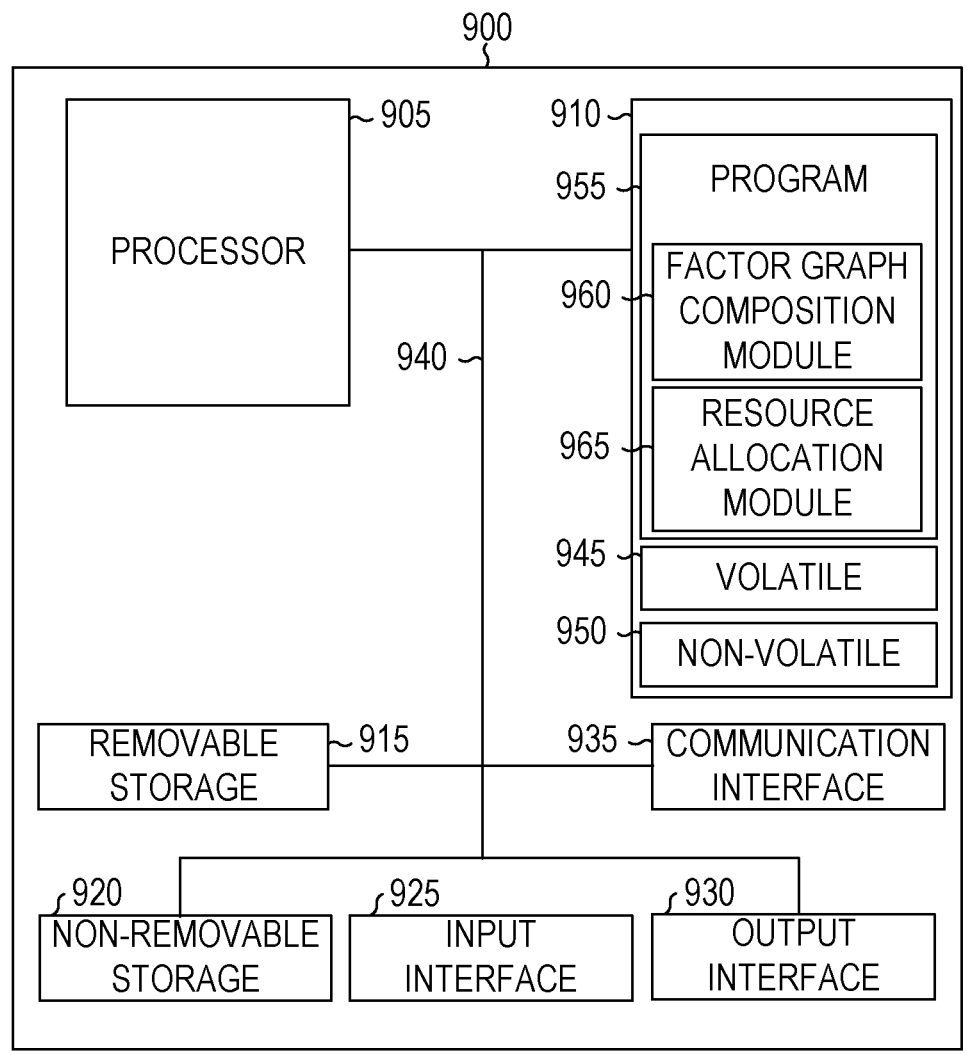
FIG. 9 is a block diagram illustrating circuitry for clients and servers that implement algorithms and perform methods, according to some example embodiments.

FIG. 9 is a block diagram illustrating circuitry for implementing algorithms and performing methods, according to example embodiments. All components need not be used in various embodiments. For example, clients, servers, and cloud-based network resources may each use a different set of components, or, in the case of servers for example, larger storage devices.

One example computing device in the form of a computer 900 (also referred to as computing device 900 and computer system 900) may include a processor 905, memory storage 910, removable storage 915, and non-removable storage 920, all connected by a bus 940. Although the example computing device is illustrated and described as the computer 900, the computing device may be in different forms in different embodiments. For example, the computing device may instead be a smartphone, a tablet, a smartwatch, or another computing device including elements the same as or similar to those illustrated and described with regard to FIG. 9. Devices such as smartphones, tablets, and smartwatches are generally collectively referred to as "mobile devices" or "user equipment." Further, although the various data storage elements are illustrated as part of the computer 900, the storage may also or alternatively include cloud-based storage accessible via a network, such as the Internet, or server-based storage.

The memory storage 910 may include volatile memory 945 and non-volatile memory 950, and may store a program 955. The computer 900 may include—or have access to a computing environment that includes—a variety of computer-readable media, such as the volatile memory 945, the non-volatile memory 950, the removable storage 915, and the non-removable storage 920. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 900 may include or have access to a computing environment that includes an input interface 925, an output interface 930, and a communication interface 935. The output interface 930 may interface to or include a display device, such as a touchscreen, that also may serve as an input device. The input interface 925 may interface to or include one or more of a touchscreen, a touchpad, a mouse, a keyboard, a camera, one or more device-specific buttons, one or more sensors integrated within or coupled via wired or wireless data connections to the computer 900, and other input devices. The computer 900 may operate in a networked environment using the communication interface 935 to connect to one or more remote computers, such as database servers. The remote computer may include a personal computer (PC), server, router, network PC, peer device or other common network node, or the like. The communication interface 935 may connect to a local-area network (LAN), a wide-area network (WAN), a cellular network, a WiFi network, a Bluetooth network, or other networks.

Computer-readable instructions stored on a computer-readable medium (e.g., the program 955 stored in the memory storage 910) are executable by the processor 905 of the computer 900. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 955 is shown as including a factor graph composition module 960 and a resource allocation module 965. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The factor graph composition module 960 is configured to compose factor graphs. For example, the communication interface 935 may receive data defining component factor graphs and a composition script containing instructions for composing the component factor graphs. The factor graph composition module 960 generates one or more composite factor graphs from the component factor graphs based on the composition script.

The resource allocation module 965 is configured to allocate resources in a network computing environment. For example, CPU time, memory, disk storage, network bandwidth, and other computing resources may be allocated to tasks, processes, or threads. In some example embodiments, the resource allocation module 965 allocates resources based on factor graphs (e.g., the one or more composite factor graphs generated by the factor graph composition module 960).

Figure 10:
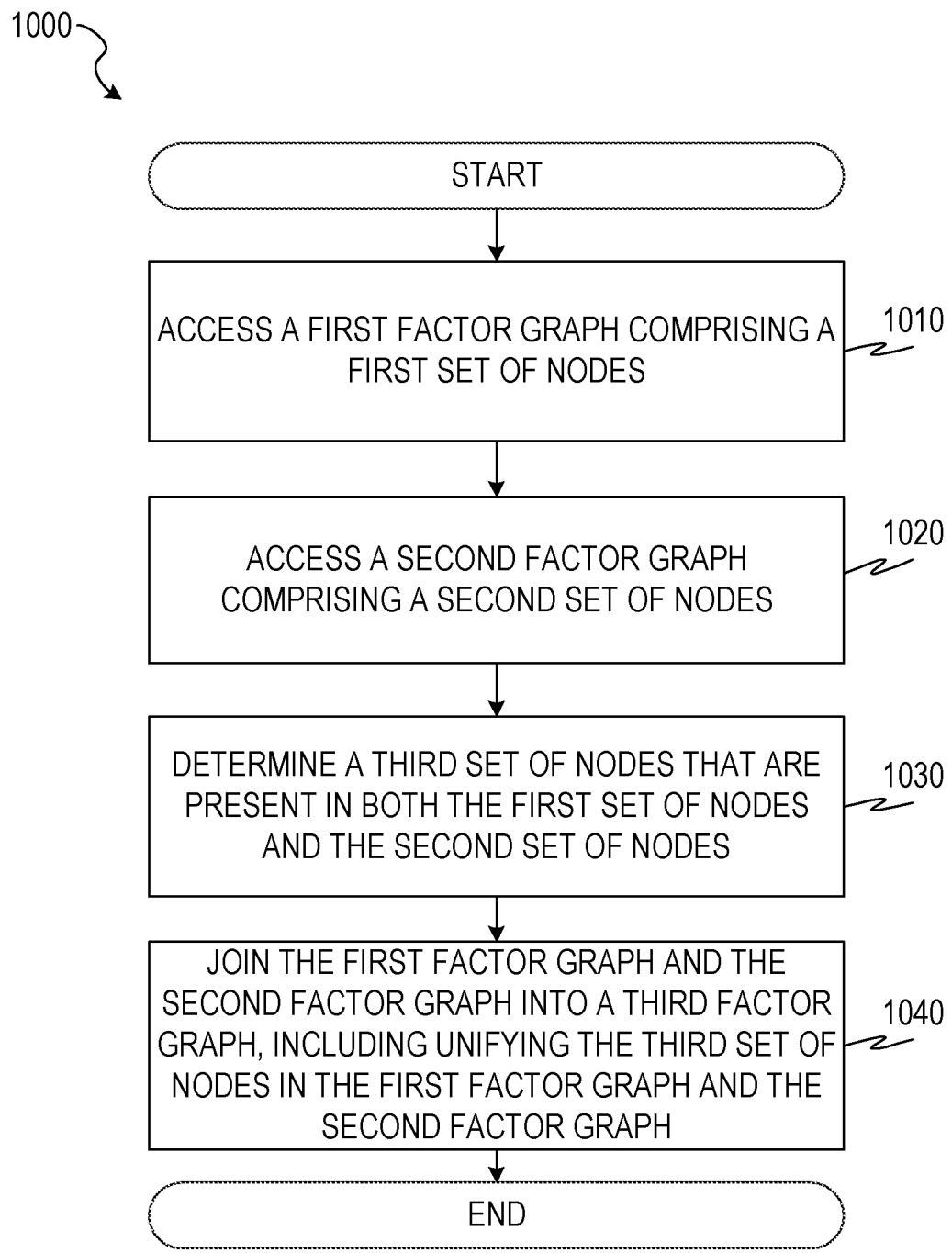
FIG. 10 is a flowchart illustration of a method of a mechanism for programmable composition of factor graphs, according to some example embodiments.

FIG. 10 is a flowchart illustration of a method 1000 of a mechanism for programmable composition of factor graphs, according to some example embodiments. The method 1000 includes operations 1010, 1020, 1030, and 1040. By way of example and not limitation, the method 1000 is described as being performed by elements of the computer 900, described above with respect to FIG. 9.

In operation 1010, the factor graph composition module 960 accesses a first factor graph comprising a first set of nodes. For example, the factor graph 330 of FIG. 3 may be accessed by reading a representation of the factor graph 330 from the non-removable storage 920 into the memory storage 910.

In operation 1020, the factor graph composition module 960 accesses a second factor graph comprising a second set of nodes. For example, the factor graph 332 of FIG. 3 may be accessed.

In operation 1030, the factor graph composition module 960 determines a third set of nodes that are present in both the first set of nodes and the second set of nodes. For example, each node in the first set of nodes may be compared to each node in the second set of nodes to determine if the node of the first set of nodes has the same label as the node of the second set of nodes. If a node with a matching label is found, a node with that label is added to the third set of nodes.

In operation 1040, the factor graph composition module 960 joins the first factor graph and the second factor graph into a third factor graph, unifying the third set of nodes in the first factor graph and the second factor graph in the process. For example, the factor graphs 330 and 332 of FIG. 3 may be joined into the factor graph 338. The factor graph 338 includes the nodes 308, 310, and 320 as well as a node unifying the nodes 312 and 318.

Figure 11:
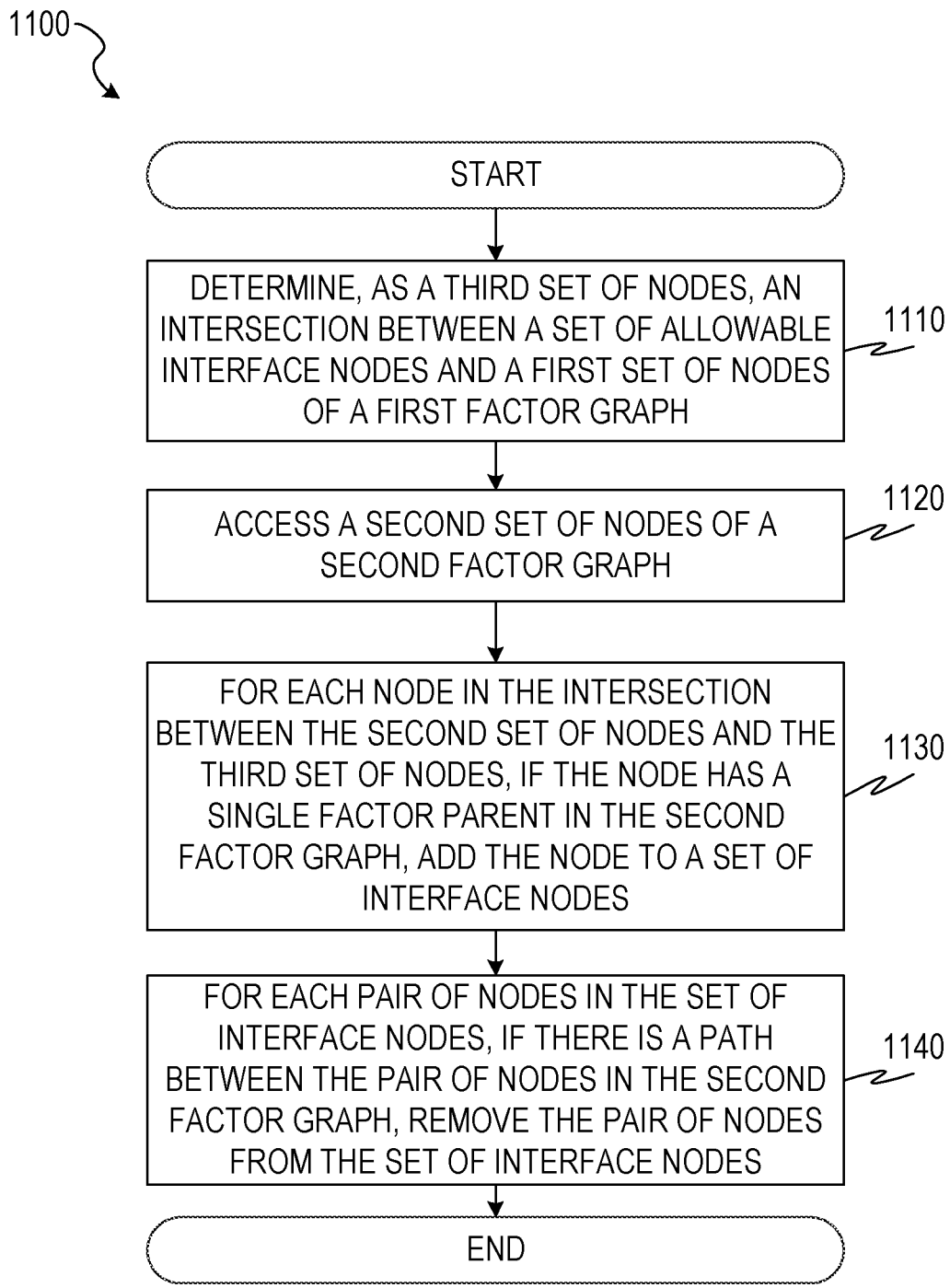
FIG. 11 is a flowchart illustration of a method for identifying a set of interface nodes, according to some example embodiments.

FIG. 11 is a flowchart illustration of a method 1100 for identifying a set of interface nodes, according to some example embodiments. The method 1100 includes operations 1110, 1120, 1130, and 1140. By way of example and not limitation, the method 1100 is described as being performed by elements of the computer 900, described above with respect to FIG. 9.

In operation 1110, the factor graph composition module 960 determines, as a third set of nodes, an intersection between a set of allowable interface nodes and a first set of nodes of a first factor graph. For example, the factor graph composition module 960 may have received an identifier of a first factor graph, an identifier of a second factor graph, and a set of allowable interface nodes as parameters to a function call that returns a set of interface nodes between the first factor graph and the second factor graph, wherein the returned set of interface nodes is limited to the nodes in the set of allowable interface nodes. Based on these input parameters, the third set of nodes comprising the intersection between the set of allowable interface nodes and the first set of nodes of the first factor graph is determined.

In operation 1120, the factor graph composition module 960 accesses a second set of nodes for a second factor graph. For example, the second set of nodes for the second factor graph may have been passed as a parameter to a function of the factor graph composition module 960.

In operation 1130, the factor graph composition module 960 iterates over each node in the intersection between the second set of nodes and the third set of nodes and, if the node has a single factor parent in the second factor graph, adds the node to a set of interface nodes.

In operation 1140, the factor graph composition module 960 considers each pair of nodes in the set of interface nodes and, if there is a path between the pair of nodes in the second factor graph, removes the pair of nodes from the set of interface nodes. In this way, no loops (wherein a node is a direct or indirect parent or child of itself) are created when the first factor graph and the second factor graph are joined using the resulting set of interface nodes. After each pair of nodes in the set of interface nodes has been considered, the remaining set of interface nodes may be returned by the factor graph composition module 960.

In some example embodiments, the method 1100 performs a method of finding interface nodes. The method 1100 may be used as part of a join operation, described by the pseudo-code below.

```
// output graph GZ = join of input graphs GX and GY, with permissible
interface
// nodes defined by the set Nodes
GZ = join(GX, GY, Nodes)
    // find the interface nodes, e.g., by the method 1100
    C = find_interface_nodes(GX, GY, Nodes)
    // if there are no interface nodes, return an empty graph
    If C is empty, return { }
    // consider each node in the interface nodes
    For each node Ci in C
        Remove the factor parent fi of Ci in GY
        Copy Ci into GZ
        parent(Ci in GZ) = parent(Ci in GX)
        children(Ci in GZ) = children (Ci in GX) and children
        (Ci in GY)
    Copy GX without C into GZ
    Copy GY without C into GZ
```

The method above can be used to join an arbitrary number of factor graphs, as described by the pseudo-code below:

```
G0 = join(G1, ..., Gn, Nodes)
    // create a stack of factor graphs, GS
    GS = [G1, ..., Gn]
    // merge the factor graphs one at a time until all factor graphs have
    been merged
    While length(GS) > 1
        GZ = join(pop(GS), pop(GS), Nodes)
        push(GZ, GS)
    // return the fully-merged factor graph
    Return pop(GS)
```

Figure 12:
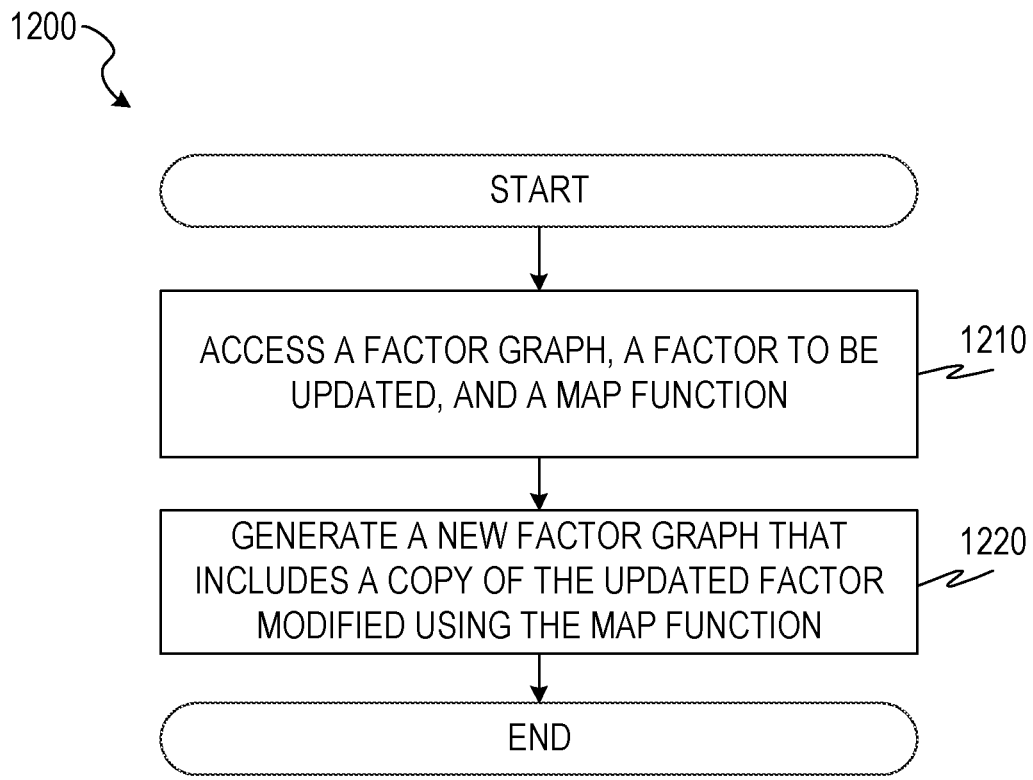
FIG. 12 is a flowchart illustration of a method of a mechanism for programmable composition of factor graphs, according to some example embodiments.

FIG. 12 is a flowchart illustration of a method 1200 of a mechanism for programmable composition of factor graphs, according to some example embodiments. The method 1200 includes operations 1210 and 1220. By way of example and not limitation, the method 1200 is described as being performed by elements of the computer 900, described above with respect to FIG. 9. The method 1200 may implement a select operator that takes three parameters: a factor graph, a factor, and a map function. The select operator may return a new factor graph.

In operation 1210, the factor graph composition module 960 accesses a factor graph, a factor to be updated, and a map function. For example, the factor graph, the factor to be updated, and the map function may be passed as parameters to a select operator. The map function is a function that maps a first matrix to a second matrix, where the two matrices have the same dimensions.

In operation 1220, the factor graph composition module 960 generates a new factor graph that includes a copy of the updated factor modified using the map function. For example, the factor graph may be copied into a new factor graph. The map function is performed on a matrix of the copied factor to be updated and the output matrix of the map function used to replace the matrix of the factor in the new factor graph. For example, a map function that operates on a 3×3 matrix and keeps only terms on the major diagonal is shown below:

$$\text{map}\left(\begin{bmatrix} p_{11} & p_{12} & p_{13} \\ p_{21} & p_{22} & p_{23} \\ p_{31} & p_{32} & p_{33} \end{bmatrix}\right) = \begin{bmatrix} p_{11} & 0 & 0 \\ 0 & p_{22} & 0 \\ 0 & 0 & p_{33} \end{bmatrix}$$

Figure 13:
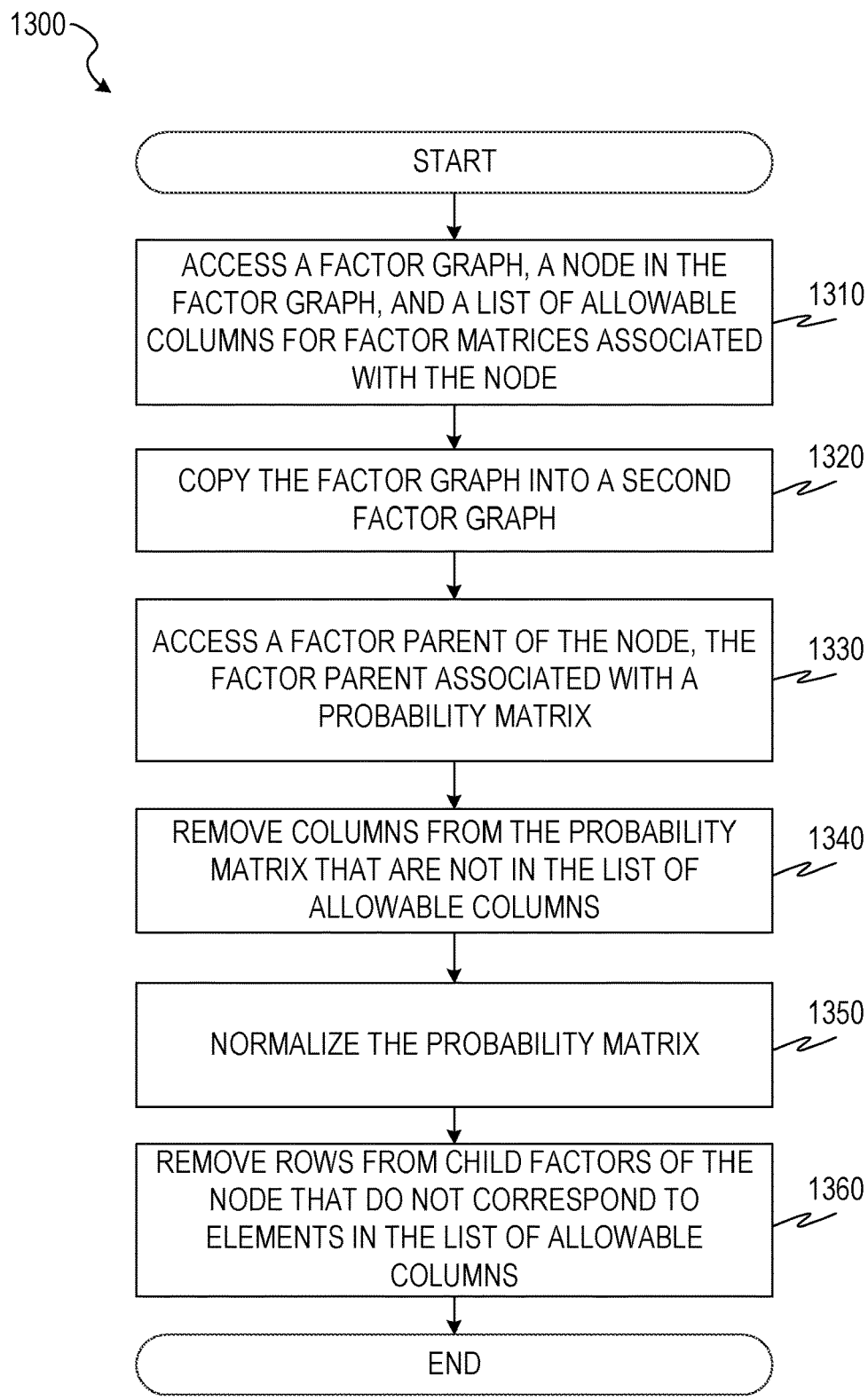
FIG. 13 is a flowchart illustration of a method of a mechanism for programmable composition of factor graphs, according to some example embodiments.

FIG. 13 is a flowchart illustration of a method 1300 of a mechanism for programmable composition of factor graphs, according to some example embodiments. The method 1300 includes operations 1310, 1320, 1330, 1340, 1350, and 1360. By way of example and not limitation, the method 1300 is described as being performed by elements of the computer 900, described above with respect to FIG. 9. The method 1300 may implement a project operator that takes three parameters: a factor graph, a node, and a list of columns. The list of columns includes at least two columns, but fewer columns than a number of values currently available to the node. The project operator may return a new factor graph in which the node can have only values corresponding to the columns in the list of columns.

In operation 1310, the factor graph composition module 960 accesses a factor graph, a node in the factor graph, and a list of allowable columns for factor matrices associated with the node. For example, the factor graph, the node, and the list may be sent as parameters to a project operator.

In operation 1320, the factor graph composition module 960 copies the accessed factor graph into a second factor graph.

The factor graph composition module 960 accesses, in the second factor graph, a factor parent of the node (operation 1330). The factor parent is associated with a probability matrix. For example, the probability matrix may be used in the second factor graph to determine the probability of each possible value of the node based on the value or values of node parents of the factor parent.

In operation 1340, the factor graph composition module 960 removes columns from the probability matrix that are not in the list of allowable columns. For example, if the probability matrix initially is $$\begin{bmatrix} p_{11} & p_{12} & p_{13} \\ p_{21} & p_{22} & p_{23} \\ p_{31} & p_{32} & p_{33} \end{bmatrix},$$

and the list of allowable columns is $[c_1, c_2]$, the resulting probability matrix excludes the third column:

$$\begin{bmatrix} p_{11} & p_{12} \\ p_{21} & p_{22} \\ p_{31} & p_{32} \end{bmatrix}.$$

Thus, the possibility of the node taking on the value previously represented by the third column is eliminated.

In operation 1350, the factor graph composition module 960 normalizes the probability matrix. A normalized probability matrix is one in which the sum of values in each row of the matrix is 1. For example, if the probability matrix, after removing any columns not in the allowable columns list, is $$\begin{bmatrix} p_{11} & p_{12} \\ p_{21} & p_{22} \\ p_{31} & p_{32} \end{bmatrix},$$

the normalized probability matrix is $$\begin{bmatrix} \frac{p_{11}}{\Sigma_1} & \frac{p_{12}}{\Sigma_1} \\ \frac{p_{21}}{\Sigma_2} & \frac{p_{22}}{\Sigma_2} \\ \frac{p_{31}}{\Sigma_3} & \frac{p_{32}}{\Sigma_3} \end{bmatrix}.$$

In operation 1360, the factor graph composition module 960 removes rows from child factors of the node that do not correspond to elements in the list of allowable columns. This reflects the fact that the node can no longer take on the values that were previously used with the removed rows.

Figure 14:
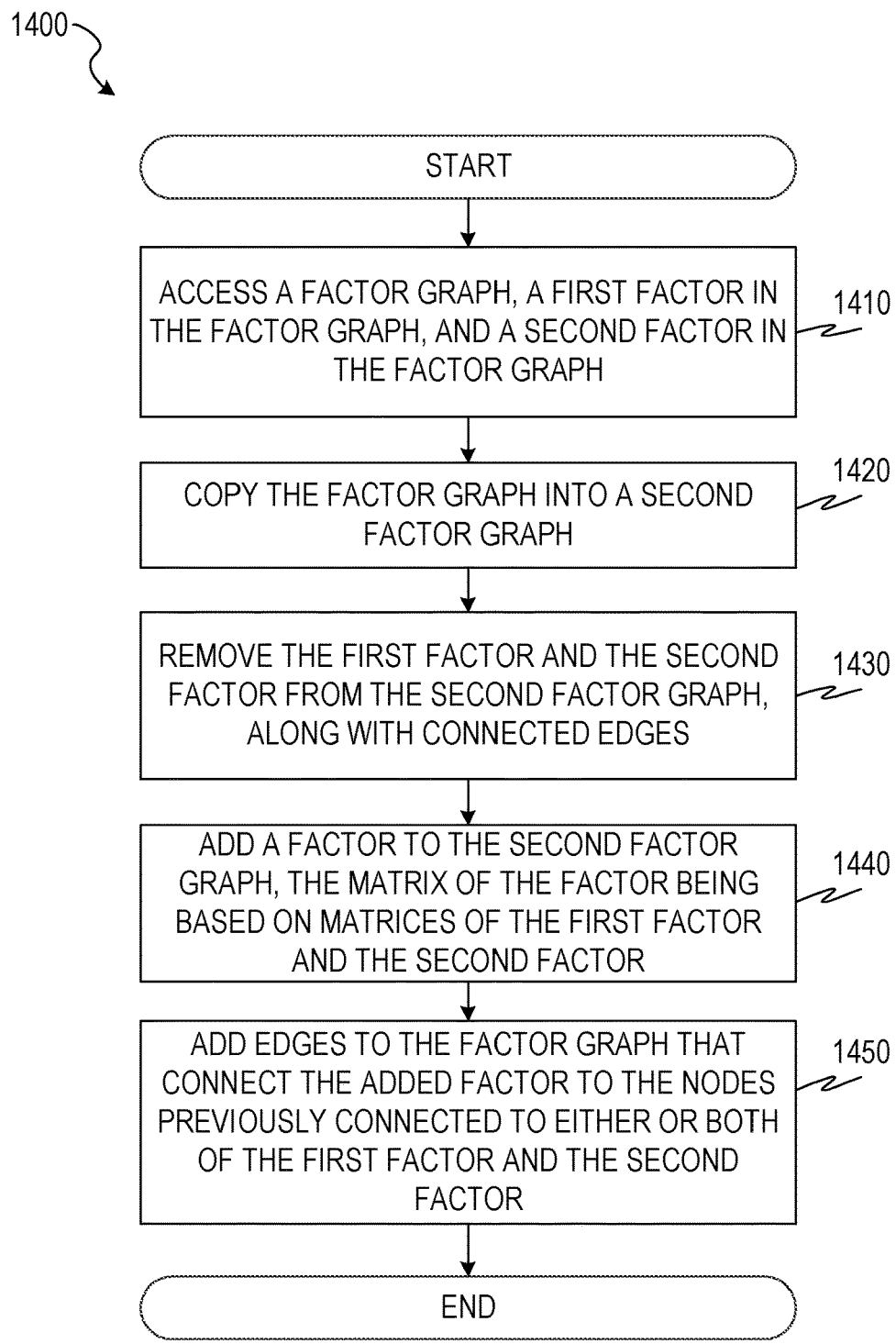
FIG. 14 is a flowchart illustration of a method of a mechanism for programmable composition of factor graphs, according to some example embodiments.

FIG. 14 is a flowchart illustration of a method 1400 of a mechanism for programmable composition of factor graphs, according to some example embodiments. The method 1400 includes operations 1410, 1420, 1430, 1440, and 1450. By way of example and not limitation, the method 1400 is described as being performed by elements of the computer 900, described above with respect to FIG. 9. The method 1400 may implement a reduce operator that takes two parameters: a factor graph and a list of factors in the factor graph. The reduce operator may return a new factor graph in which the listed factors have been combined into a single factor.

In operation 1410, the factor graph composition module 960 accesses a factor graph, a first factor in the factor graph, and a second factor in the factor graph. The factor graph, the first factor, and the second factor may have been passed as parameters to a reduce operator. In some example embodiments, the first factor and the second factor are part of a list of factors.

In operation 1420, the factor graph composition module 960 copies the accessed factor graph into a second factor graph.

In operation 1430, the factor graph composition module 960 removes the first factor and the second factor from the second factor graph, along with all edges connected to the removed factors.

In operation 1440, the factor graph composition module 960 adds a factor to the second factor graph, the matrix of the added factor being based on matrices of the first factor and the second factor. For example, the matrix of the first factor may be multiplied by the matrix of the second factor to generate the matrix of the added factor.

In operation 1450, the factor graph composition module 960 adds edges to the second factor graph that connect the added factor to the nodes previously connected to either or both of the first factor and the second factor. Nodes that were children of either factor become children of the added factor. Nodes that were otherwise connected to one or both of the first and second factors become parents of the added factor.

Figure 15:
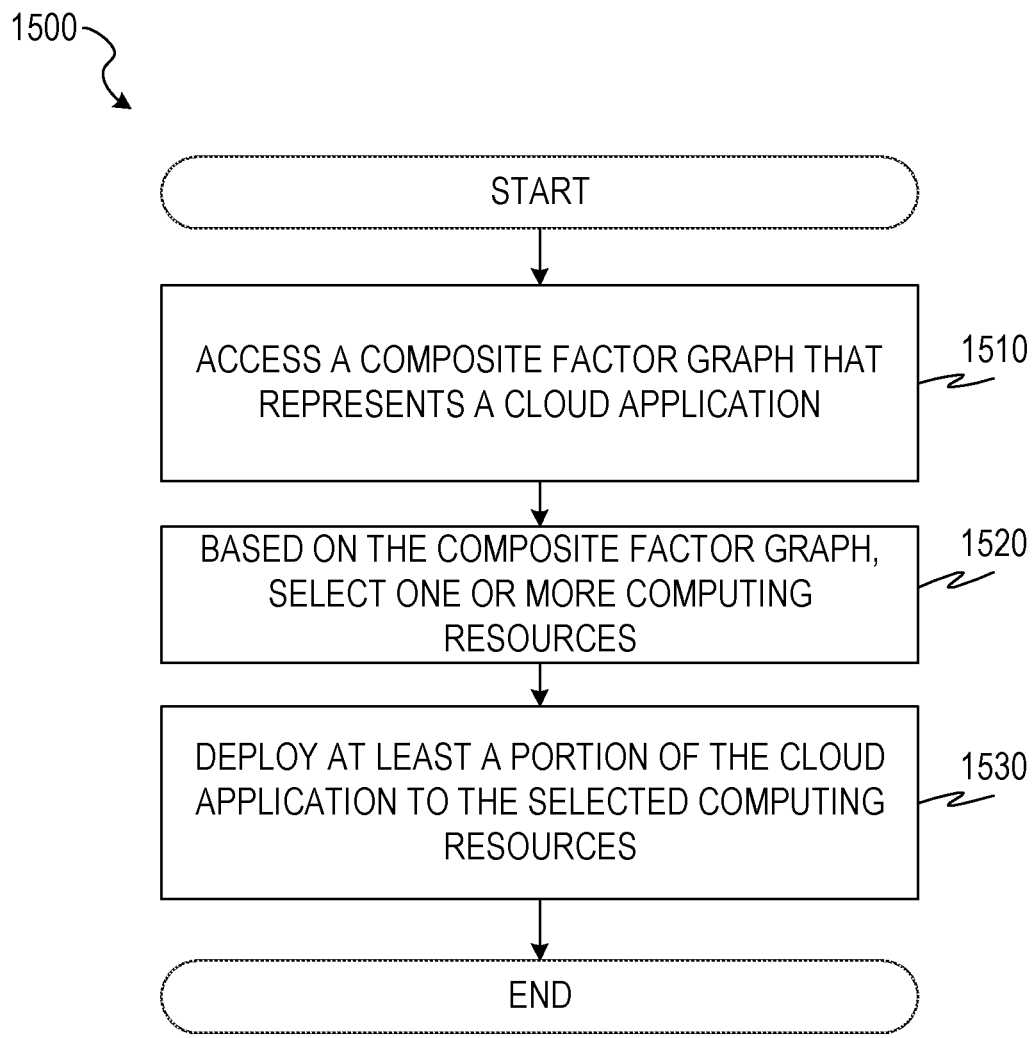
FIG. 15 is a flowchart illustration of a method of deploying a cloud application to computing resources, according to some example embodiments.

FIG. 15 is a flowchart illustration of a method 1500 of deploying a cloud application to computing resources, according to some example embodiments. The method 1500 includes operations 1510, 1520, and 1530. By way of example and not limitation, the method 1500 is described as being performed by elements of the computer 900, described above with respect to FIG. 9.

In operation 1510, the resource allocation module 965 accesses a composite factor graph that represents a cloud application. For example, a composite factor graph generated using one or more of the methods 1000, 1100, 1200, 1300, or 1400 may be accessed.

In operation 1520, the resource allocation module 965 selects one or more computing resources, based on the composite factor graph. For example, the composite factor graphs of the block diagram illustrations 700B and 800B generate probabilities of resource usages for CPU, memory, storage, and network bandwidth (e.g., the nodes 738-744 or the nodes 842-848) under various conditions of workload, capacity, and priority (e.g., the nodes 718, 720, 722, 732, 736, 820, 822, 824, 838, and 840). Applying a workload and capacity associated with the computing resources and a priority associated with the cloud application, a probability distribution of resource consumption is generated for the cloud application if deployed to each of the computing resources. Using the probability distributions, the computing resources causing the lowest expected value of resource consumption may be selected.

In operation 1530, the resource allocation module 965 deploys at least a portion of the cloud application to the selected computing resources. For example, one component of the cloud application may be deployed to a selected server. As another example, CPU time, memory resources, storage resources, and network communication resources may be assigned for use to the cloud application. Additionally or alternatively, executable code for one or more components of the cloud application may be copied to one or more of the allocated computing resources, one or more executable applications may be started in one or more servers of a data center, or any suitable combination thereof.

Figure 16:
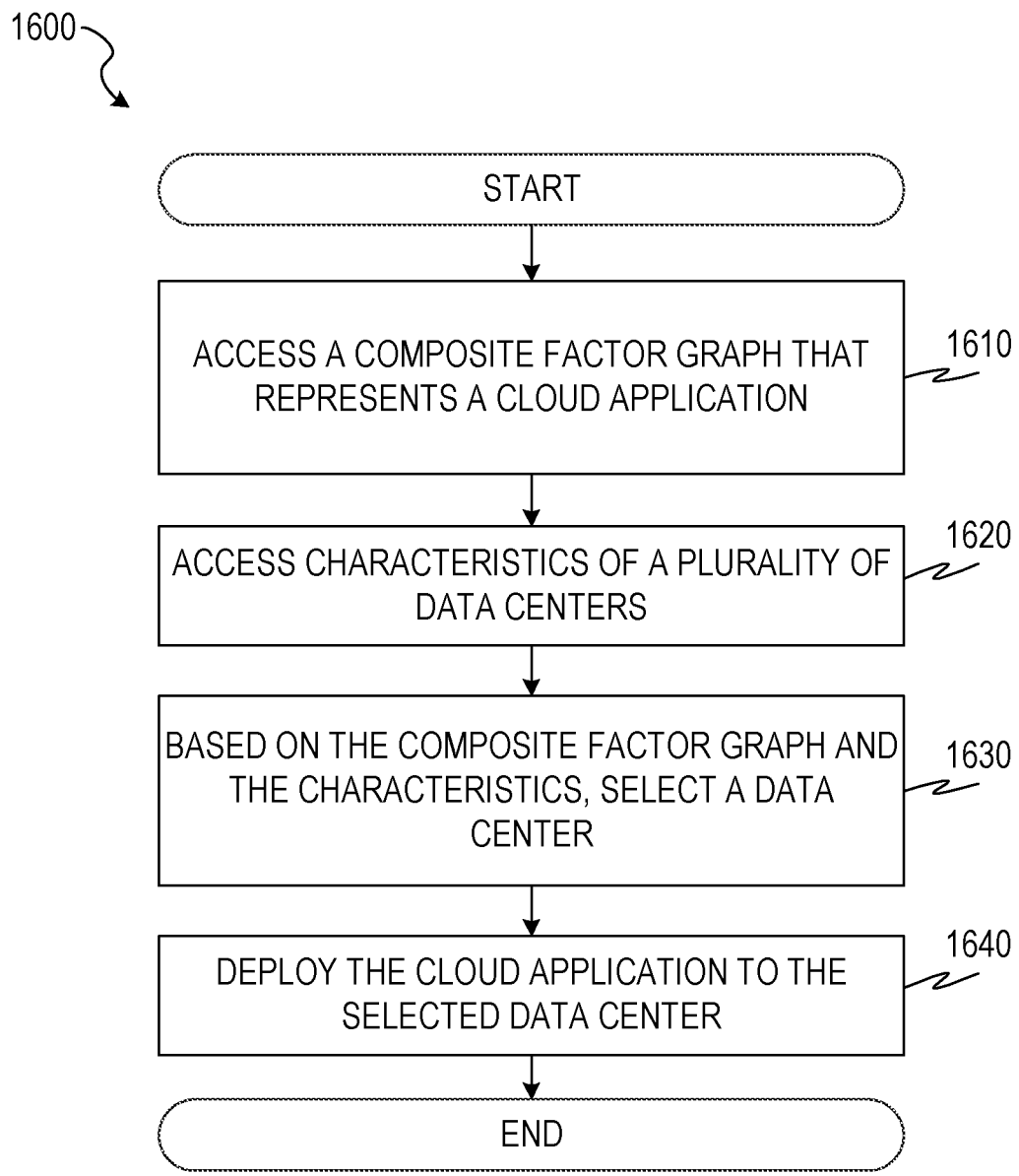
FIG. 16 is a flowchart illustration of a method of deploying a cloud application to a data center, according to some example embodiments.

FIG. 16 is a flowchart illustration of a method 1600 of deploying a cloud application to a data center, according to some example embodiments. The method 1600 includes operations 1610, 1620, 1630, and 1640. By way of example and not limitation, the method 1600 is described as being performed by elements of the computer 900, described above with respect to FIG. 9.

In operation 1610, the resource allocation module 965 accesses a composite factor graph that represents a cloud application. For example, a composite factor graph generated using one or more of the methods 1000, 1100, 1200, 1300, or 1400 may be accessed.

In operation 1620, the resource allocation module 965 accesses characteristics of a plurality of data centers. For example, data for a set of available CPUs, a set of available memories, a set of available storage devices, and a set of available network communication devices for each data center may be accessed. As another example, data for a current or predicted workload and capacity for each data center may be accessed.

In operation 1630, the resource allocation module 965 selects a data center of the plurality of data centers, based on the composite factor graph and the characteristics. For example, the composite factor graphs of the block diagram illustrations 700B and 800B generate probabilities of resource usages for CPU, memory, storage, and network bandwidth (e.g., the nodes 738-744 or the nodes 842-848) under various conditions of workload, capacity, and priority (e.g., the nodes 718, 720, 722, 732, 736, 820, 822, 824, 838, and 840). Applying a workload and capacity associated with each data center and a priority associated with the cloud application, a probability distribution of resource consumption is generated for the cloud application in each data center. Using the probability distributions, the data center causing the lowest expected value of resource consumption may be selected.

In operation 1640, the resource allocation module 965 deploys the cloud application to the selected data center. For example, CPU time, memory resources, storage resources, and network communication resources may be assigned for use to the cloud application. Additionally or alternatively, executable code for the cloud application may be copied to one or more of the allocated resources, one or more executable applications may be started in one or more servers of the data center, or any suitable combination thereof.

Figure 17:
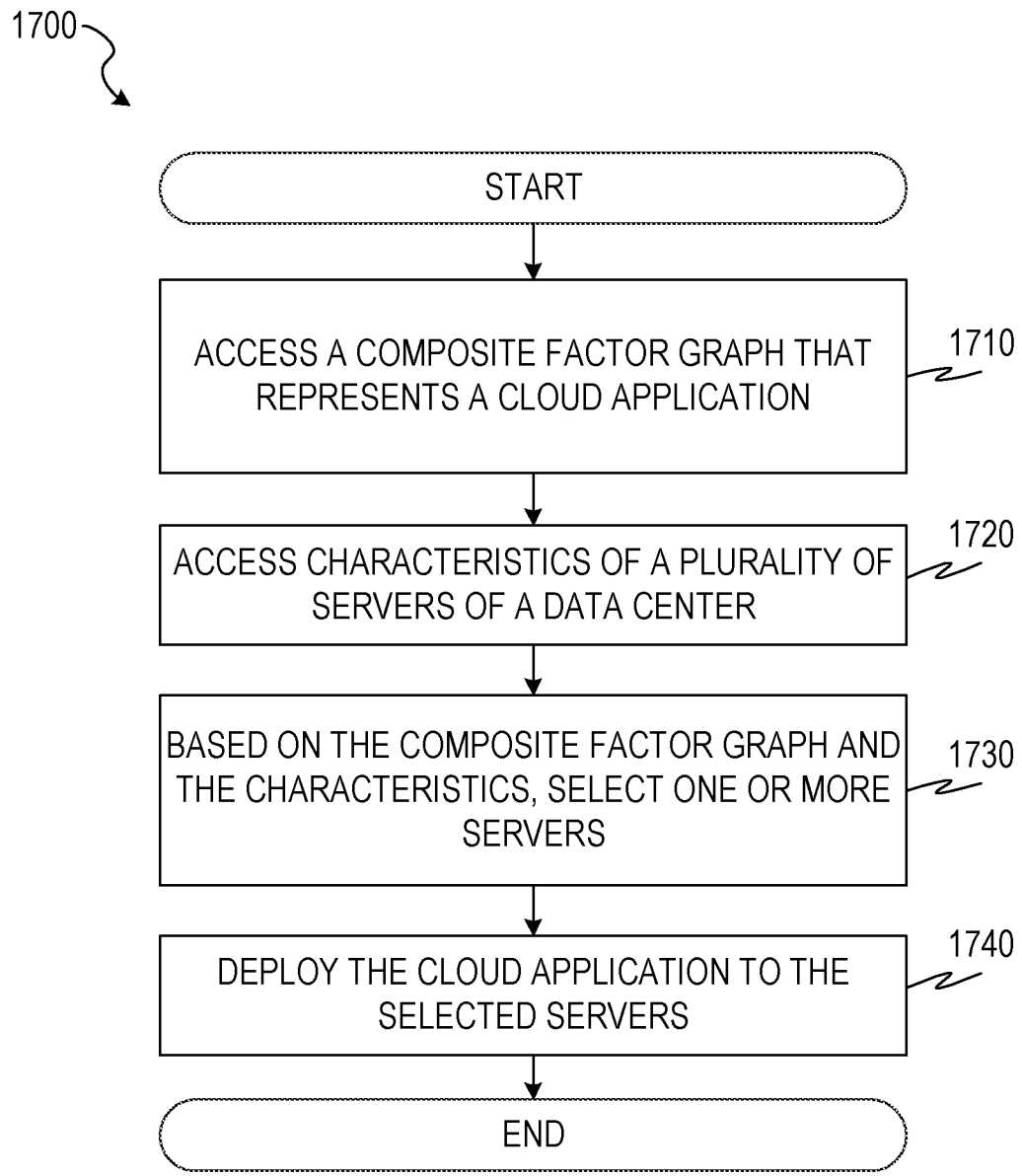
FIG. 17 is a flowchart illustration of a method of deploying a cloud application to servers of a data center, according to some example embodiments.

FIG. 17 is a flowchart illustration of a method 1700 of deploying a cloud application to servers of a data center, according to some example embodiments. The method 1700 includes operations 1710, 1720, 1730, and 1740. By way of example and not limitation, the method 1700 is described as being performed by elements of the computer 900, described above with respect to FIG. 9.

In operation 1710, the resource allocation module 965 accesses a composite factor graph that represents a cloud application. For example, a composite factor graph generated using one or more of the methods 1000, 1100, 1200, 1300, or 1400 may be accessed.

In operation 1720, the resource allocation module 965 accesses characteristics of a plurality of servers of a data center. For example, each server in the data center may have CPU characteristics (e.g., number of processors, number of cores, processor speed, or any suitable combination thereof), memory characteristics (e.g., amount of memory, access speed, data transfer rate, or any suitable combination thereof), storage characteristics (e.g., amount of storage, access speed, data transfer rate, or any suitable combination thereof), and network characteristics (e.g., network response time, data transfer rate, or any suitable combination thereof). As another example, data for a current or predicted workload and capacity for each server may be accessed.

In operation 1730, the resource allocation module 965 selects one or more servers of the plurality of servers, based on the composite factor graph and the characteristics. For example, the composite factor graphs of the block diagram illustrations 700B and 800B generate probabilities of resource usages for CPU, memory, storage, and network bandwidth (e.g., the nodes 738-744 or the nodes 842-848) under various conditions of workload, capacity, and priority (e.g., the nodes 718, 720, 722, 732, 736, 820, 822, 824, 838, and 840). Applying a workload and capacity associated with each server and a priority associated with the cloud application, a probability distribution of resource consumption is generated for the cloud application on each server. Using the probability distributions, the server or set of servers causing the lowest expected value of resource consumption may be selected. For example, a different server may be selected for each component of the cloud application.

In operation 1740, the resource allocation module 965 deploys the cloud application to the selected servers. For example, executable code for the cloud application may be copied to the allocated servers and execution of the components of the cloud application begun.

Figure 18:
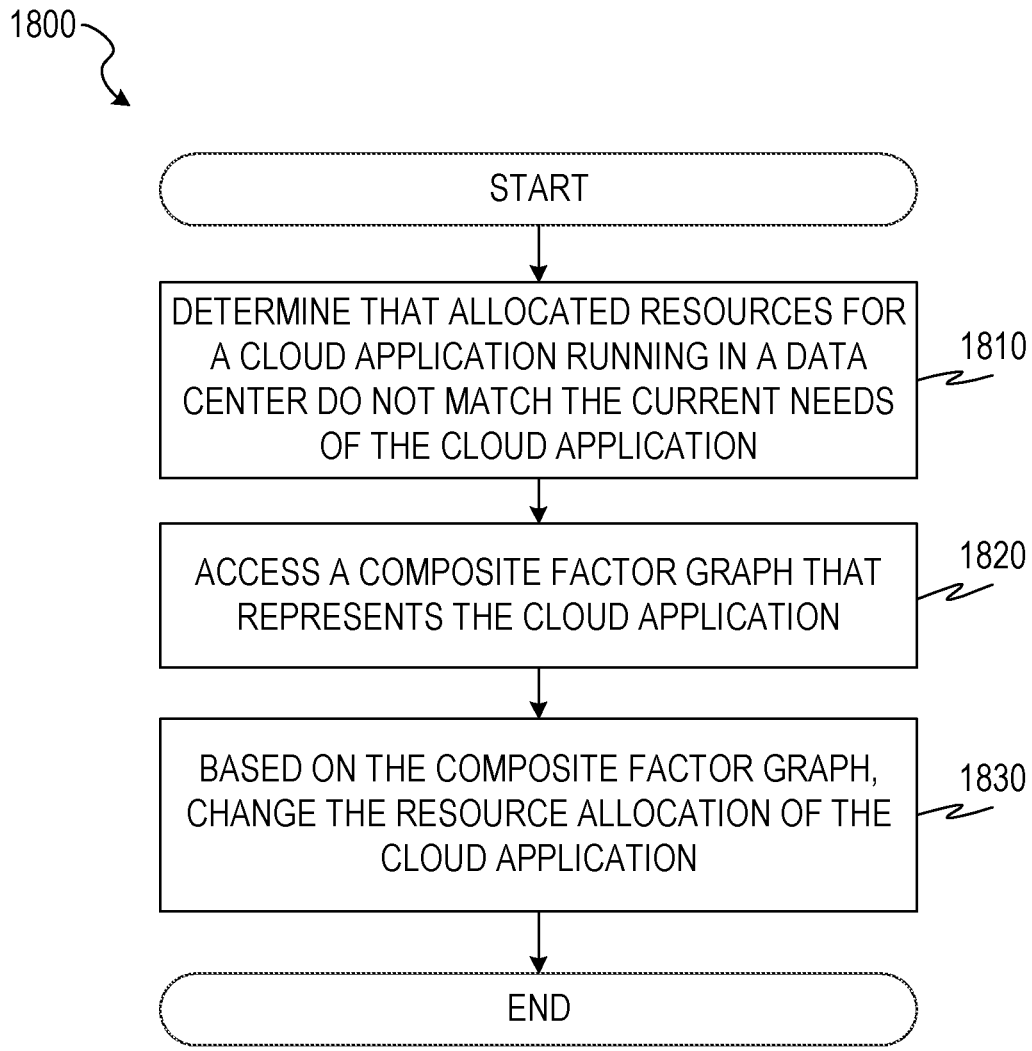
FIG. 18 is a flowchart illustration of a method of reallocating resources for a cloud application in a data center, according to some example embodiments.

FIG. 18 is a flowchart illustration of a method 1800 of reallocating resources for a cloud application in a data center, according to some example embodiments. The method 1800 includes operations 1810, 1820, and 1830. By way of example and not limitation, the method 1800 is described as being performed by elements of the computer 900, described above with respect to FIG. 9.

In operation 1810, the resource allocation module 965 determines that allocated resources for a cloud application running in a data center do not match the current needs of the cloud application. For example, a cloud application may be associated with a service level agreement that provides that the average response time of the cloud application must be below 100 ms or else the data center provider is subject to a financial penalty. Accordingly, a monitoring application may periodically check the responsiveness of the cloud application to determine the average response time. When the average response time exceeds a predetermined threshold (e.g., the agreed response time of the service level agreement, a fraction (e.g., 90%) of the agreed response time of the service level agreement, or another threshold), the monitoring application triggers the remaining operations of the method 1800.

In operation 1820, the resource allocation module 965 accesses a composite factor graph that represents the cloud application. For example, a composite factor graph generated using one or more of the methods 1000, 1100, 1200, 1300, or 1400 may be accessed from a database of composite factor graphs representing cloud applications running in the data center.

In operation 1830, the resource allocation module 965 changes the resource allocation of the cloud application, based on the composite factor graph. For example, operations 1720-1740 of the method 1700 may be performed to identify one or more servers to deploy the cloud application to and the cloud application may be deployed to the identified servers. In some example embodiments, the changing of the resource allocation results in more or fewer resources being allocated to the cloud application without changing servers on which cloud application components are run. For example, network resources and storage resources may be allocated or deallocated without stopping and restarting applications. In other example embodiments, the changing of the resource allocation results in migration of one or more cloud application components (e.g., virtual machines) from one server to another.

Devices and methods disclosed herein may reduce time, processor cycles, and power consumed in allocating resources to clients. Devices and methods disclosed herein may also result in improved allocation of resources to clients, resulting in improved throughput and quality of service. Existing deployments may already use TOSCA or Heat for cloud application deployments. Reusing TOSCA/Heat for generating composite factor graphs may result in efficiencies.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of deploying a cloud application, comprising:
  accessing, by one or more processors, a first factor graph that represents a first component of the cloud application, the first factor graph comprising a first set of nodes;

accessing, by the one or more processors, a second factor graph that represents a second component of the cloud application, the second factor graph comprising a second set of nodes;
determining, by the one or more processors, a third set of nodes that are present in both the first set of nodes and the second set of nodes;
joining, by the one or more processors, the first factor graph and the second factor graph into a third factor graph, wherein the joining includes:
unifying the third set of nodes in the first factor graph and the second factor graph;
creating the third factor graph as an empty factor graph; and
for each node in the third set of nodes:
removing a factor parent of the node from the second factor graph;
copying the node into the third factor graph; and
setting a parent of the copied node to a parent of the node in the first factor graph;
based on the third factor graph, selecting, by the one or more processors, one or more computing resources; and
deploying, by the one or more processors, at least a portion of the cloud application to the selected computing resources.

2. The computer-implemented method of claim 1, wherein:
the selecting of the one or more computing resources comprises selecting a data center of a plurality of data centers.

3. The computer-implemented method of claim 1, wherein:
the selecting of the one or more computing resources comprises selecting one or more servers of a data center.

4. The computer-implemented method of claim 1, wherein:
the deploying is in response to a determination that resources allocated to the cloud application do not match needs of the cloud application.

5. The computer-implemented method of claim 1, wherein:
the cloud application is running in a first data center of a plurality of data centers;
the selecting of the one or more computing resources comprises simulating deployment of the cloud application to one or more of the plurality of data centers; and
the deploying of at least the portion of the cloud application to the selected computing resources comprises deploying at least the portion of the cloud application to a second data center of the plurality of data centers.

6. The computer-implemented method of claim 1, wherein:
the second factor graph further comprises a set of factors; and
the third set of nodes excludes nodes that are associated with more than one factor in the set of factors.

7. The computer-implemented method of claim 1, further comprising:
for each pair of nodes in the third set of nodes:
determining if a first node of the pair is an ancestor node in the second factor graph of a second node of the pair;
determining if the second node of the pair is an ancestor node in the second factor graph of the first node of the pair; and
if the first node and the second node are each an ancestor node of the other in the second factor graph, removing the first node and the second node from the third set of nodes.

8. The computer-implemented method of claim 1, wherein the joining of the first factor graph and the second factor graph into the third factor graph further comprises:
for each node in the third set of nodes:
setting the copied node as a parent of children of the node in the first factor graph and children of the node in the second factor graph.

9. The computer-implemented method of claim 8, wherein the joining of the first factor graph and the second factor graph into the third factor graph further comprises:
for each node in the first set of nodes that is not in the third set of nodes:
copying the node from the first factor graph into the third factor graph; and
for each node in the second set of nodes that is not in the third set of nodes:
copying the node from the second factor graph into the third factor graph.

10. The computer-implemented method of claim 1, wherein:
the third factor graph comprises a set of factors; and
the method further comprises:
identifying a first factor in the third factor graph, a first set of edges comprising all edges connected to the first factor in the third factor graph, and a fourth set of nodes comprising all nodes connected by an edge to the first factor in the third factor graph;
identifying a second factor in the third factor graph, a second set of edges comprising all edges connected to the second factor in the third factor graph, and a fifth set of nodes comprising all nodes connected by an edge to the second factor in the third factor graph;
removing the first factor and the first set of edges from the third factor graph;
removing the second factor and the second set of edges from the third factor graph;
based on the first factor and the second factor, determining a third factor; and
inserting the third factor into the third factor graph, with edges connecting the third factor to the fourth set of nodes and the fifth set of nodes.

11. The computer-implemented method of claim 10, wherein:
a node is in both the fourth set of nodes and the fifth set of nodes;
the edge connecting the node to the first factor is directed from the node to the first factor;
the edge connecting the node to the second factor is directed from the second factor to the node; and
the edge connecting the node to the third factor is directed from the third factor to the node.

12. A composition server comprising:
a memory storage comprising instructions; and
one or more processors in communication with the memory storage, wherein the one or more processors execute the instructions to perform:
accessing a first factor graph that represents a first component of a cloud application, the first factor graph comprising a first set of nodes;
accessing a second factor graph that represents a second component of the cloud application, the second factor graph comprising a second set of nodes;

determining a third set of nodes that are present in both the first set of nodes and the second set of nodes;
joining the first factor graph and the second factor graph into a third factor graph, wherein the joining includes:
unifying the third set of nodes in the first factor graph and the second factor graph;
creating the third factor graph as an empty factor graph; and
for each node in the third set of nodes:
  removing a factor parent of the node from the second factor graph;
  copying the node into the third factor graph; and
  setting a parent of the copied node to a parent of the node in the first factor graph;
based on the third factor graph, selecting one or more computing resources; and
deploying at least a portion of the cloud application to the selected computing resources.

13. The composition server of claim 12, wherein:
the selecting of the one or more computing resources comprises selecting a data center of a plurality of data centers.

14. The composition server of claim 12, wherein:
the selecting of the one or more computing resources comprises selecting one or more servers of a data center.

15. The composition server of claim 12, wherein:
the deploying is in response to a determination that resources allocated to the cloud application do not match needs of the cloud application.

16. The composition server of claim 12, wherein:
the cloud application is running in a first data center of a plurality of data centers;
the selecting of the one or more computing resources comprises simulating deployment of the cloud application to one or more of the plurality of data centers; and
the deploying of at least the portion of the cloud application to the selected computing resources comprises deploying at least the portion of the cloud application to a second data center of the plurality of data centers.

17. The composition server of claim 12, wherein:
the second factor graph further comprises a set of factors; and
the third set of nodes excludes nodes that are associated with more than one factor in the set of factors.

18. The composition server of claim 12, wherein the processors further perform:
for each pair of nodes in the third set of nodes:
  determining if a first node of the pair is an ancestor node in the second factor graph of a second node of the pair;
  determining if the second node of the pair is an ancestor node in the second factor graph of the first node of the pair; and
  if the first node and the second node are each an ancestor node of the other in the second factor graph, removing the first node and the second node from the third set of nodes.

19. A non-transitory computer-readable medium storing computer instructions for deploying a cloud application, that when executed by one or more processors, cause the one or more processors to perform steps of:
accessing a first factor graph that represents a first component of the cloud application, the first factor graph comprising a first set of nodes;
accessing a second factor graph that represents a second component of the cloud application, the second factor graph comprising a second set of nodes;
determining a third set of nodes that are present in both the first set of nodes and the second set of nodes;
joining the first factor graph and the second factor graph into a third factor graph, wherein the joining includes:
unifying the third set of nodes in the first factor graph and the second factor graph;
creating the third factor graph as an empty factor graph; and
for each node in the third set of nodes:
  removing a factor parent of the node from the second factor graph;
  copying the node into the third factor graph; and
  setting a parent of the copied node to a parent of the node in the first factor graph;
based on the third factor graph, selecting one or more computing resources; and
deploying at least a portion of the cloud application to the selected computing resources.

* * * * *